United States Patent
Nagata

(10) Patent No.: US 12,420,701 B2
(45) Date of Patent: Sep. 23, 2025

(54) INFORMATION PROCESSING APPARATUS, INFORMATION PROCESSING METHOD, PROGRAM, AND PROJECTION APPARATUS

(71) Applicant: Sony Group Corporation, Tokyo (JP)

(72) Inventor: Koji Nagata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 97 days.

(21) Appl. No.: 18/245,913

(22) PCT Filed: Sep. 9, 2021

(86) PCT No.: PCT/JP2021/033100
§ 371 (c)(1),
(2) Date: Mar. 20, 2023

(87) PCT Pub. No.: WO2022/070820
PCT Pub. Date: Apr. 7, 2022

(65) Prior Publication Data
US 2023/0356653 A1 Nov. 9, 2023

(30) Foreign Application Priority Data
Oct. 1, 2020 (JP) .................... 2020-167178

(51) Int. Cl.
*B60Q 1/24* (2006.01)
*B60Q 1/50* (2006.01)
(Continued)

(52) U.S. Cl.
CPC ........... *B60Q 1/247* (2022.05); *B60Q 1/525* (2013.01); *G06F 3/013* (2013.01); *B60Q 2400/50* (2013.01)

(58) Field of Classification Search
CPC ...................................................... B60Q 1/247
See application file for complete search history.

(56) References Cited

U.S. PATENT DOCUMENTS 10,773,732 B1 * 9/2020 Alexander ........... G05D 1/0212
2008/0129539 A1 * 6/2008 Kumon ................... B60R 1/27
340/901

(Continued)

FOREIGN PATENT DOCUMENTS

DE 102013222467 A1 * 2/2015 ............. B60K 35/00
EP 3401162 A1 11/2018
(Continued)

OTHER PUBLICATIONS

International Search Report and Written Opinion mailed on Nov. 16, 2021, received for PCT Application PCT/JP2021/033100, filed on Sep. 9, 2021, 9 pages including English Translation.

*Primary Examiner* — Joseph H Feild
*Assistant Examiner* — Pameshanand Mahase
(74) *Attorney, Agent, or Firm* — XSENSUS LLP

(57) ABSTRACT

An information processing apparatus according to an embodiment of the present technology includes an acquisition unit and a projection control unit. The acquisition unit acquires surrounding environment information regarding a surrounding environment of a vehicle. The projection control unit controls, on a basis of the surrounding environment information, display of a projection pattern projected on a peripheral road surface of the vehicle from a projection unit mounted on the vehicle. Accordingly, the safety for driving can be enhanced.

20 Claims, 15 Drawing Sheets

(51) Int. Cl.
*G06F 3/01* (2006.01)
*G08G 1/16* (2006.01)

(56) References Cited

U.S. PATENT DOCUMENTS

| | | | | |
|---|---|---|---|---|
| 2013/0046441 | A1* | 2/2013 | Marczok | G05D 1/0212 |
| | | | | 701/41 |
| 2014/0169627 | A1* | 6/2014 | Gupta | G06V 20/588 |
| | | | | 382/103 |
| 2016/0342205 | A1* | 11/2016 | Shigeta | B60K 35/00 |
| 2017/0015238 | A1 | 1/2017 | Yamada | |
| 2017/0203685 | A1 | 7/2017 | Hirai | |
| 2020/0277008 | A1* | 9/2020 | Tran | B60Q 9/00 |

FOREIGN PATENT DOCUMENTS

| | | |
|---|---|---|
| JP | 2003-231450 A | 8/2003 |
| JP | 2006-036005 A | 2/2006 |
| WO | 2016/114048 A1 | 7/2016 |
| WO | 2020/067113 A1 | 4/2020 |

* cited by examiner

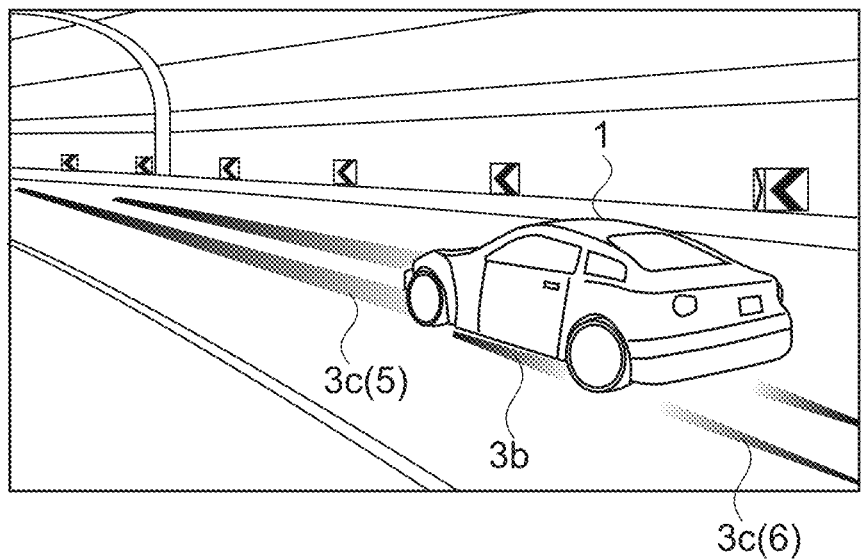
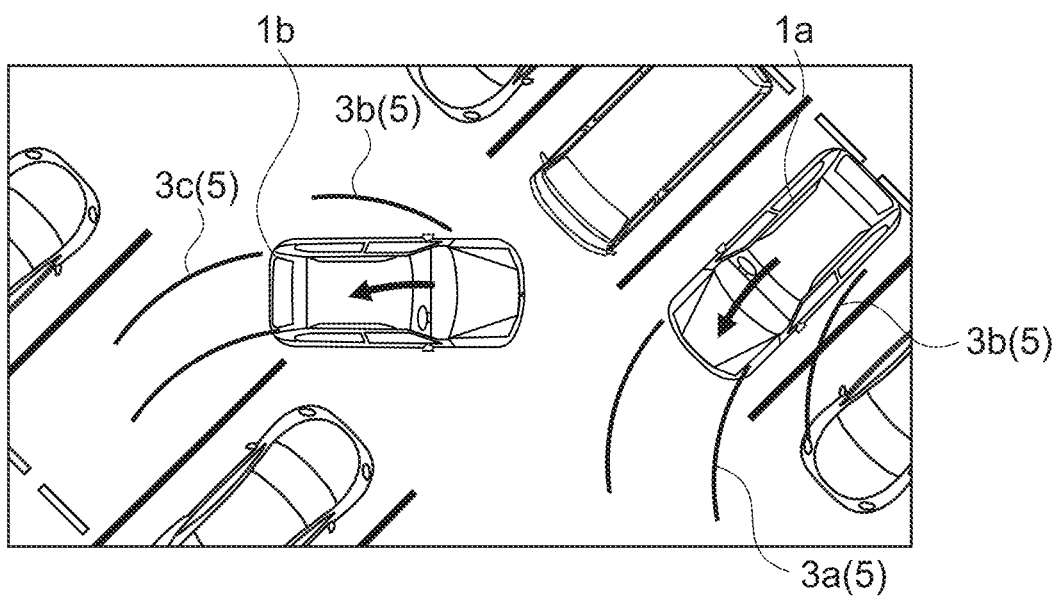
FIG.3

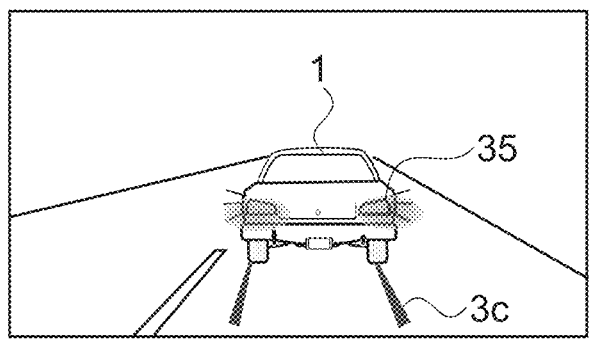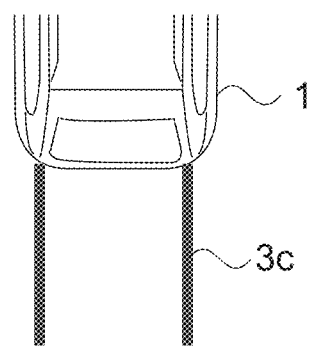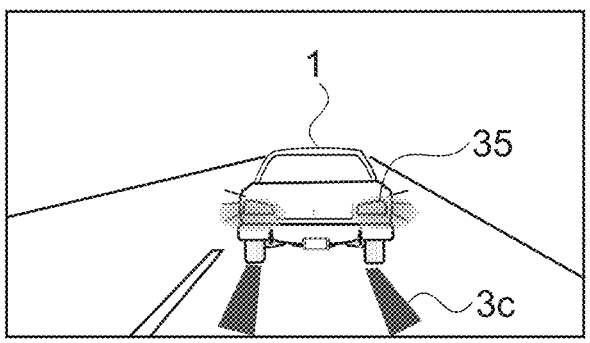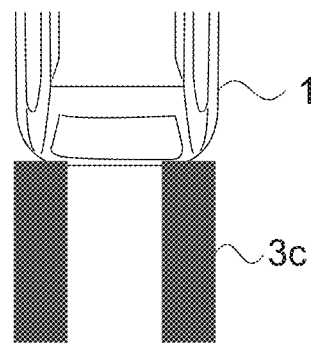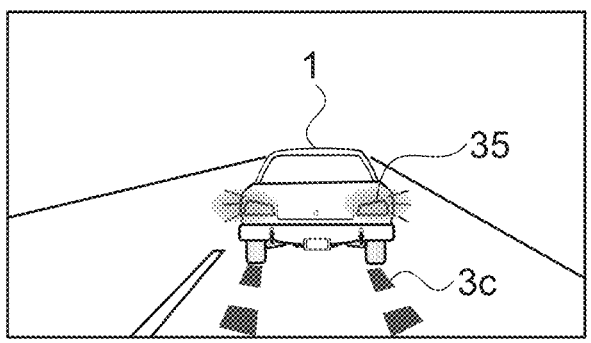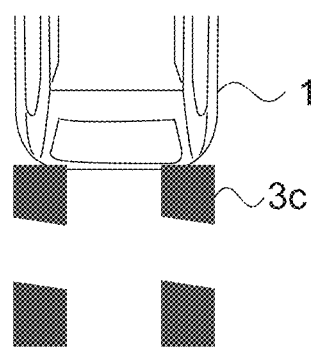
FIG.13

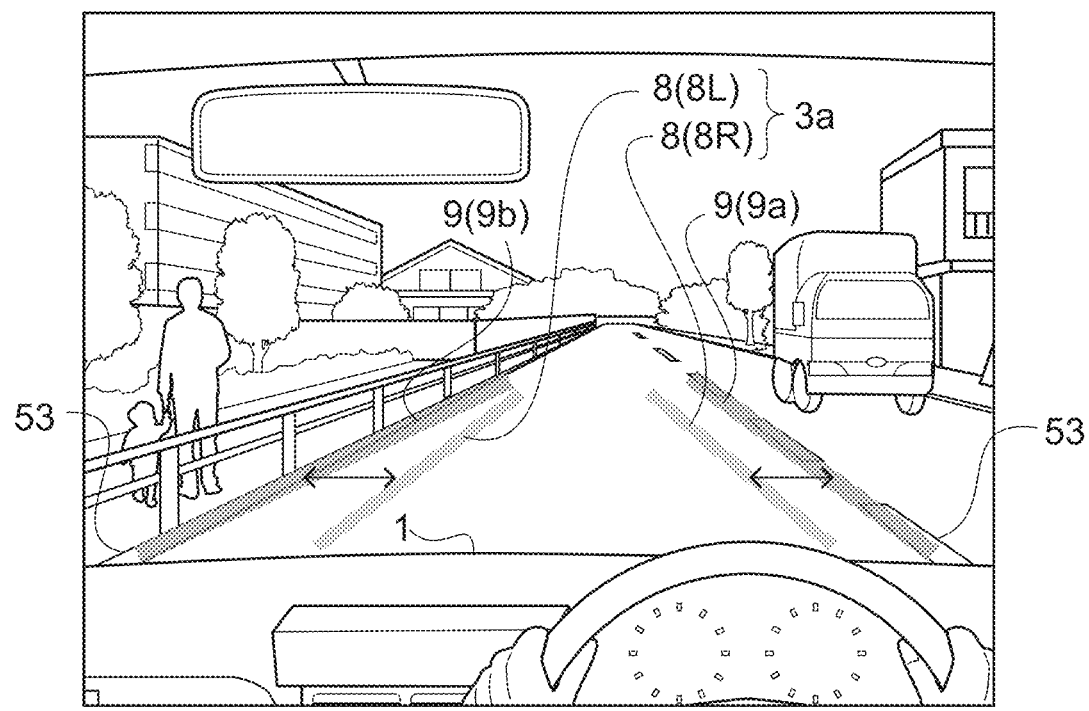
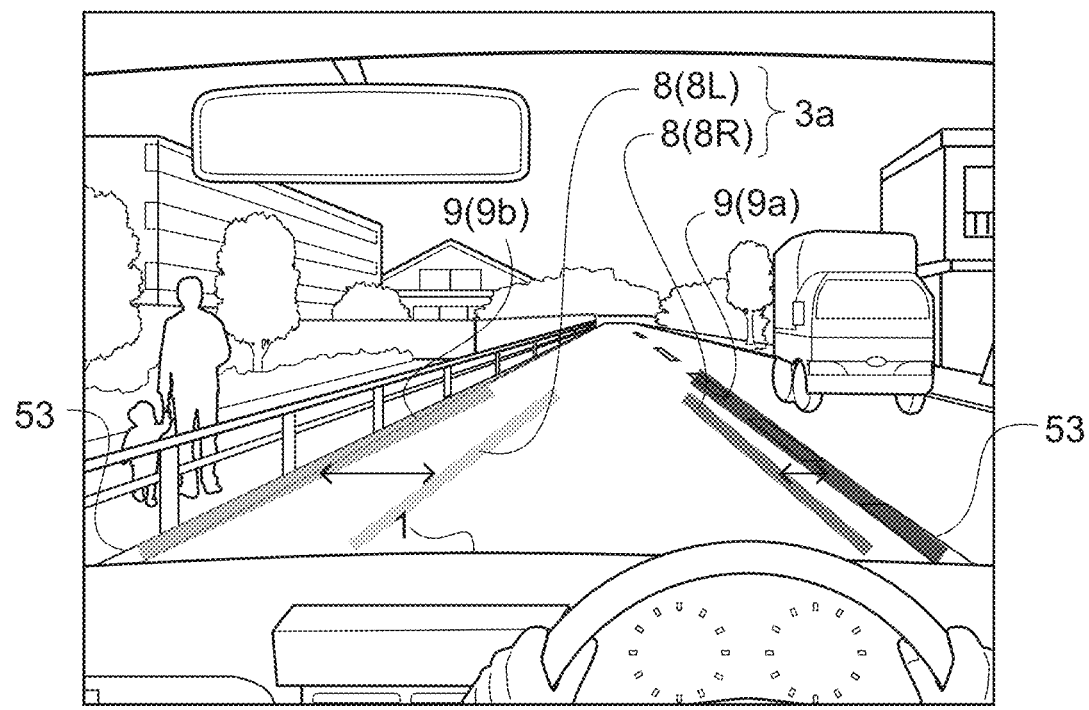
FIG.17

INFORMATION PROCESSING APPARATUS, INFORMATION PROCESSING METHOD, PROGRAM, AND PROJECTION APPARATUS

CROSS-REFERENCE TO RELATED APPLICATIONS

The present application is based on PCT filing PCT/JP2021/033100, filed Sep. 9, 2021, which claims priority to Japanese Application No. 2020-167178, filed Oct. 1, 2020, the entire contents of each are incorporated herein by reference.

TECHNICAL FIELD

The present technology relates to an information processing apparatus, an information processing method, a program, and a projection apparatus that can be applied to display control of a projection pattern to be projected to a road surface from a vehicle.

BACKGROUND ART

Patent Literature 1 has described a predicted traveling trajectory display apparatus that displays a predicted traveling trajectory of a vehicle on the ground. This apparatus calculates a predicted traveling trajectory of a vehicle on the basis of a steering angle of a vehicle steering wheel and forward movement/backward movement information indicating a forward movement/backward movement of the vehicle. Then, it controls an irradiation angle of a laser light emitter mounted on the vehicle and draws the predicted traveling trajectory on the ground (paragraphs, [0021], [0022], [0023], of specification, FIG. 7, and the like in Patent Literature 1).

CITATION LIST

Patent Literature

Patent Literature 1: Japanese Patent Application Laid-open No. 2006-036005

DISCLOSURE OF INVENTION

Technical Problem

Presenting a traveling direction of the vehicle as described above can call attention of people inside and outside the vehicle. In an actual traffic environment, it is necessary to call attention to various targets in addition to the traveling direction of the vehicle, and it is desirable to provide a technology capable of enhancing the safety for driving.

In view of the above-mentioned circumstances, it is an objective of the present technology to provide an information processing apparatus, an information processing method, a program, and a projection apparatus by which the safety for driving can be enhanced.

Solution to Problem

In order to accomplish the above-mentioned objective, an information processing apparatus according to an embodiment of the present technology includes an acquisition unit and a projection control unit.

The acquisition unit acquires surrounding environment information regarding a surrounding environment of a vehicle.

The projection control unit controls, on the basis of the surrounding environment information, display of a projection pattern projected on a peripheral road surface of the vehicle from a projection unit mounted on the vehicle.

In this information processing apparatus, the projection pattern is projected on the peripheral road surface from the projection unit provided in the vehicle. The display of the projection pattern is controlled on the basis of the surrounding environment information regarding the surrounding environment of the vehicle. Accordingly, for example, the situation where the vehicle is located or the like can be presented to people inside or outside the vehicle via the projection pattern, and the safety for driving can be enhanced.

An information processing method according to an embodiment of the present technology is an information processing method to be executed by a computer system and includes acquiring surrounding environment information regarding a surrounding environment of a vehicle.

Display of a projection pattern projected on a peripheral road surface of the vehicle from a projection unit mounted on the vehicle is controlled on the basis of the surrounding environment information.

A program according to an embodiment of the present technology causes a computer system to execute the following steps.

A step of acquiring surrounding environment information regarding a surrounding environment of a vehicle.

A step of controlling, on the basis of the surrounding environment information, display of a projection pattern projected on a peripheral road surface of the vehicle from a projection unit mounted on the vehicle.

A projection apparatus according to an embodiment of the present technology includes a projection unit, an acquisition unit, and a projection control unit.

The projection unit is mounted on a vehicle and projects a projection pattern on a peripheral road surface of the vehicle.

The acquisition unit acquires surrounding environment information regarding a surrounding environment of the vehicle.

The projection control unit controls, on the basis of the surrounding environment information, display of the projection pattern projected from the projection unit.

BRIEF DESCRIPTION OF DRAWINGS

FIG. 3 A schematic view showing examples of a scene where the projection patterns are projected.

FIG. 13 A schematic view showing examples of rear patterns according to a collision risk.

FIG. 17 A schematic view showing examples of a scene where vehicle width lines are projected.

MODE(S) FOR CARRYING OUT THE INVENTION

Hereinafter, embodiments according to the present technology will be described with reference to the drawings.

First Embodiment

Figure 1:
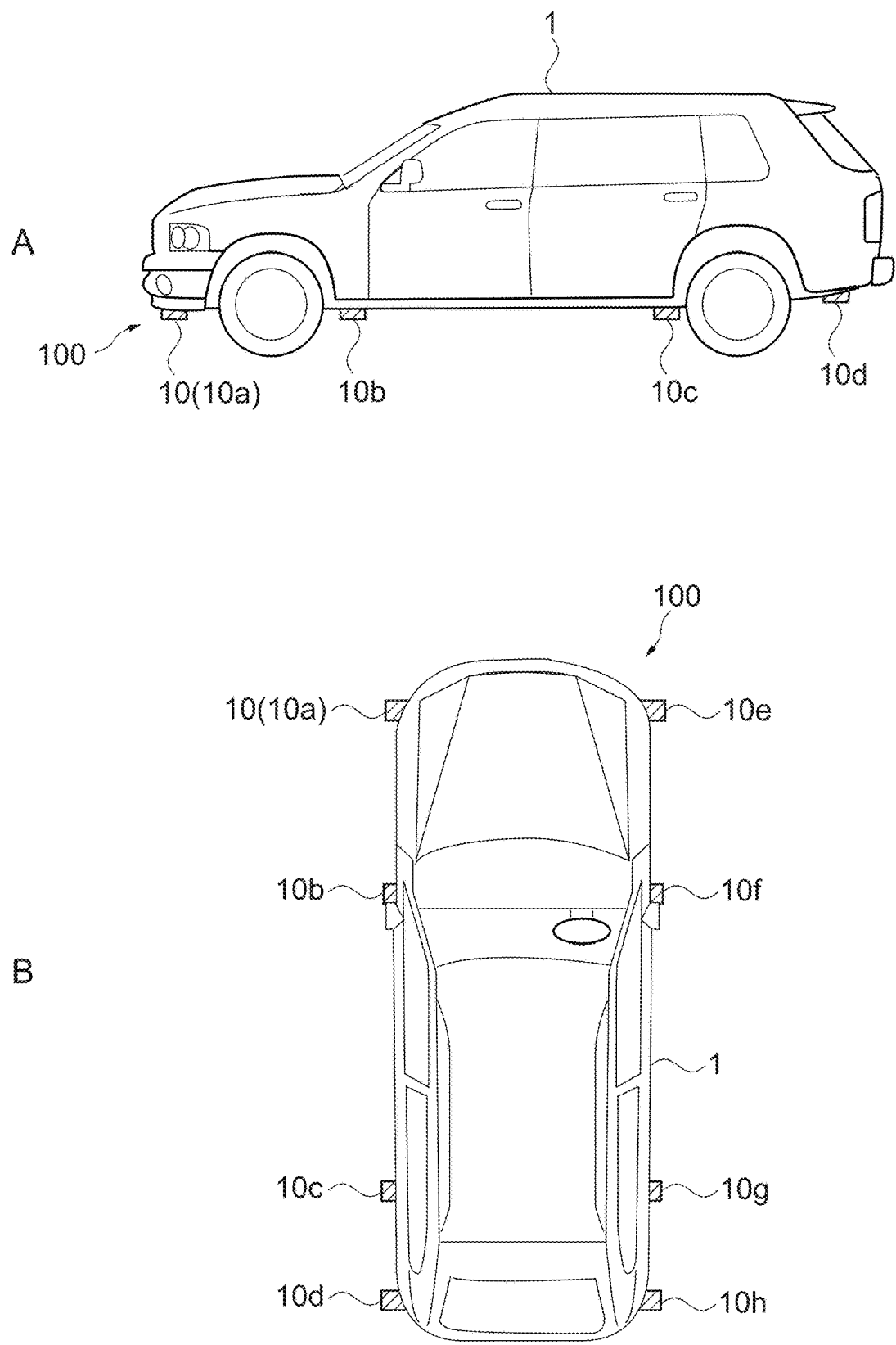
FIG. 1 A schematic view showing an outer appearance of a vehicle on which a projection apparatus according to a first embodiment of the present technology is mounted.

FIG. 1 is a schematic view showing an outer appearance of a vehicle on which a projection apparatus according to a first embodiment of the present technology is mounted. FIG. 1A is a perspective view showing a configuration example of a vehicle 1 and FIG. 1B is a top view of the vehicle 1 as viewed from above. A projection apparatus 100 is mounted on the vehicle 1. The projection apparatus 100 projects figures on a peripheral road surface of the vehicle 1.

The projection apparatus 100 has a plurality of projection units 10. The projection units 10 are elements (projectors) that project figures by radiating light to a road surface. Hereinafter, figures projected from the projection units 10 to the peripheral road surface of the vehicle 1 will be referred to as projection patterns. The projection apparatus 100 is capable of individually controlling projection patterns projected from the respective projection units 10. A specific configuration of the projection unit 10 will be described later.

Eight projection units 10a to 10h provided to the vehicle 1 are schematically shown in FIGS. 1A and 1B. In the example shown in FIG. 1, the projection units 10a to 10d and the projection units 10e to 10h are arranged to be line-symmetric to each other on left and right sides of a bottom portion of the vehicle 1.

The projection units 10a and 10e are arranged in a front bottom portion of the vehicle 1 (e.g., a lower portion of the front bumper). The projection units 10a and 10e project projection patterns on the front of the vehicle 1, for example. The projection units 10b and 10f are arranged at front bottom portions of front doors. The projection units 10c and 10g are arranged at rear bottom portions of rear doors. The projection units 10b and 10f and the projection units 10c and 10g project projection patterns on lateral sides of the vehicle 1, for example. The projection units 10d and 10h are arranged in a rear bottom portion of the vehicle 1 (e.g., a lower portion of the rear bumper). The projection units 10d and 10h project projection patterns on the rear of the vehicle 1, for example.

It should be noted that in FIG. 1B, in order to show positions of the respective projection units 10 (projectors) in the top view of the vehicle 10, for the sake of convenience, the respective projection units 10 are shown protruding from the vehicle body. In the actual configuration, the projection units 10 are housed in a vehicle body lower portion and installed so that they cannot be seen from above. This allows the projection apparatus 100 to be implemented without deteriorating the outer appearance of the vehicle 10.

Alternatively, as shown in FIG. 1B, the respective projection units 10 may be installed protruding from the vehicle body. Accordingly, for example, it is possible to enlarge the range in which the projection patterns can be projected.

The arrangement, number, and the like of the projection units 10 are not limited.

For example, the projection units 10 (the projection units 10a and 10e in FIG. 1) that project patterns on the front of the vehicle 10 may be installed on a vehicle body front surface. Specifically, the projection units 10 may be provided at the periphery of head lights (e.g., upper, lower, left, and right sides of the head lights) or at the periphery of the fog lights (e.g., upper, lower, left, and right sides of the fog lights). Moreover, the projection units 10 may be provided at a front grille position, a center portion of the entire vehicle body surface, and the like. Moreover, left front and right front projection patterns may be projected from a single projection unit 10.

Moreover, for example, the projection units 10 (the projection units 10b, 10c, 10f, and 10g in FIG. 1) that project patterns on the lateral sides of the vehicle 10 may be provided in bottom portions of side-view mirrors and lower portions of b-pillars dividing the front and rear doors (center portions of the vehicle in a front-rear direction).

Moreover, for example, the projection units 10 (the projection units 10d and 10h in FIG. 1) that project patterns on the rear of the vehicle 10 may be installed in a vehicle body rear surface. Specifically, the projection units 10 may be provided at the periphery of brake lights (e.g., upper, lower, left, and right sides of the brake lights), at the periphery of a license plate (e.g., upper, lower, left, and right sides of the license plate), or the center portion of the vehicle body rear surface, for example. Moreover, left rear and right rear projection patterns may be projected from a single projection unit 10.

In addition, the projection units 10 may be arranged as appropriate at such positions that desired projection patterns can be projected.

Figure 2:
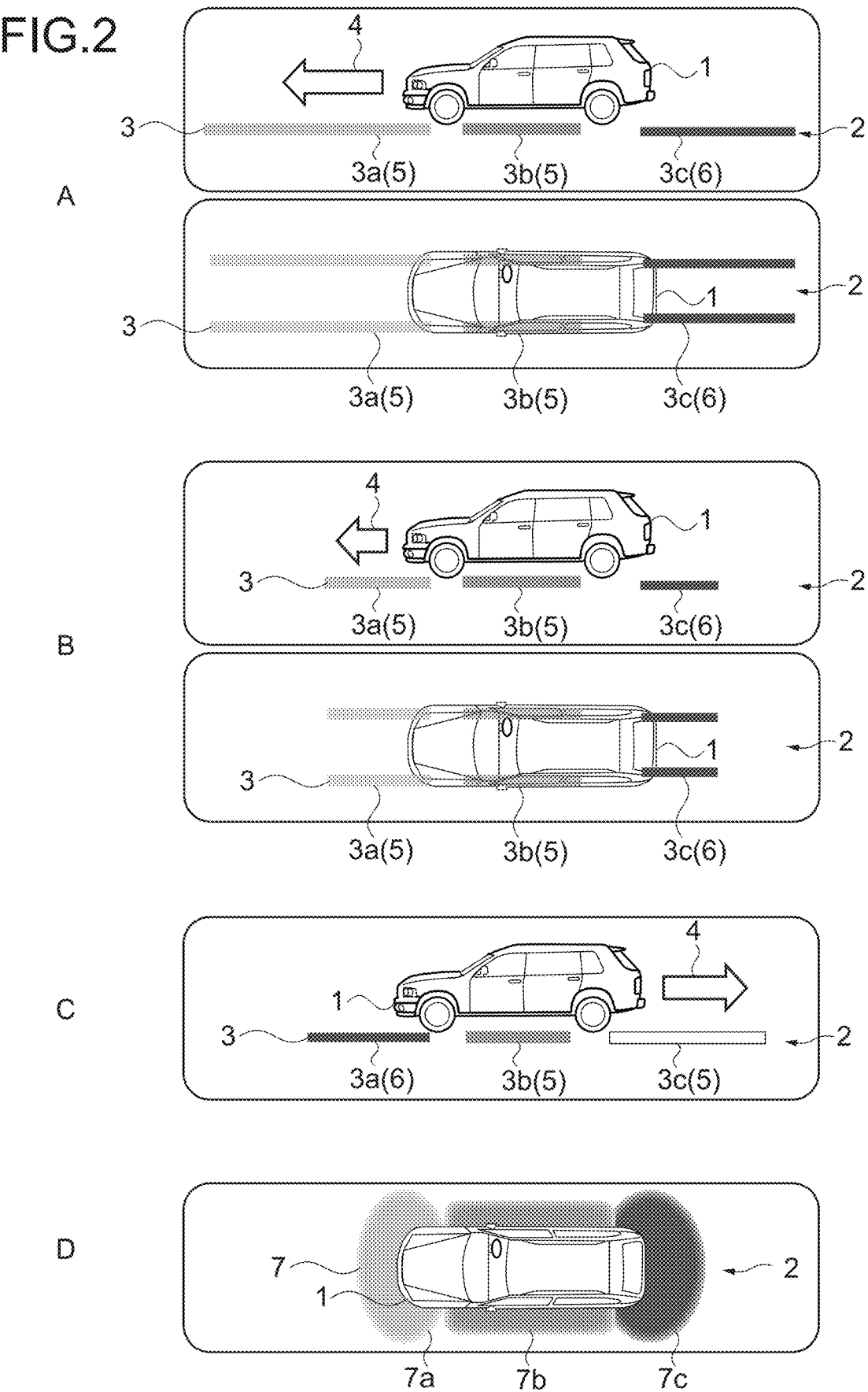
FIG. 2 A schematic view showing examples of projection patterns.

FIG. 2 is a schematic view showing examples of the projection patterns. FIG. 3 is a schematic view showing examples of a scene where the projection patterns are projected.

In the present embodiment, a plurality of projection modes is selected in accordance with a situation where the vehicle 1 operates and projection patterns 2 according to the projection mode are projected. In FIGS. 2A to 2D, projection patterns 2 projected on respective projection modes, i.e., a normal driving mode, a low-speed driving mode, a reverse mode, and a parking mode are schematically shown.

The plurality of projection modes excluding the parking mode is modes on which the vehicle 1 travels actually. On such a mode on which the vehicle 1 travels (FIGS. 2A to 2C), linearly extending line patterns 3 are used as the projection patterns 2. Thus, the projection patterns 2 include linear patterns (line patterns 3). The line patterns 3 are consecutive band-like patterns, for example. Alternatively, the line patterns 3 may be configured by arranging small patterns at constant intervals linearly.

In the present embodiment, the line patterns 3 include linear first patterns projected on the front in a traveling direction 4 of the vehicle 1 and linear second patterns projected on the rear in the traveling direction 4.

In FIGS. 2A to 2C, the arrow indicating the traveling direction 4 of the vehicle 1 is schematically shown. The size of the arrow indicates the speed of the vehicle 1. Patterns projected on the front in this traveling direction 4 are the first patterns and patterns projected on the rear are the second patterns.

Moreover, in the present embodiment, third patterns (middle lines 3b to be described later) projected on a peripheral road surface of the center portion of the vehicle 1 (road surface ranging from below the vehicle 1 to the lateral sides) are used.

As will be described later, the projection apparatus 100 calculates each of predicted trajectories 5 on which the vehicle 1 is predicted to pass and passing trajectories 6 on which the vehicle 1 has passed. The predicted trajectories 5 and the passing trajectories 6 are indicated with the first patterns and the second patterns. That is, the first patterns are generated as the line patterns 3 indicating the predicted trajectories 5 of the vehicle 1 and the second patterns are generated as the line patterns 3 indicating the passing trajectories of the vehicle 1.

Hereinafter, the normal driving mode, the low-speed driving mode, and the reverse mode on which the line patterns 3 are used and the parking mode on which the patterns other than the line patterns 3 are used will be each described.

FIG. 2A shows an example of the projection patterns 2 projected on the normal driving mode. The upper and lower diagrams of FIG. 2A are schematic views as the vehicle 1 is viewed from the lateral side and from above.

Here, the normal driving mode refers to, for example, a projection mode selected when the vehicle 1 is traveling forward as normal without slowdown. The normal driving mode is selected, for example, when the vehicle 1 travels at a speed lower than a general slowdown speed (e.g., lower than 10 km per hour). Therefore, the normal driving mode is used during forward travel on a travel lane, which is different from travel where slowdown is required, such as a stopping operation, a right turn operation, a left turn operation, and a parking operation.

On the normal driving mode, as the projection patterns 2, three types of line patterns 3 of front lines 3a, middle lines 3b, and rear lines 3c are projected. The respective lines 3a to 3c are configured as a pair of lines patterns 3 projected on the left and right sides of the vehicle 1.

The front lines 3a are line patterns 3 projected on the road surface at the front of the vehicle 1. The left and right front lines 3a are projected from, for example, the projection units 10a and 10e shown in FIG. 1.

The middle lines 3b are line patterns 3 projected on the road surface on the lateral sides from below the vehicle 1. The left middle line 3b projected from, for example, the projection units 10b and 10c and the right middle line 3b is projected from, for example, the projection units 10f and 10g.

The rear lines 3c are line patterns 3 projected on the road surface at the rear of the vehicle 1. The rear lines 3c on the left and right sides are projected from, for example, the projection units 10d and 10h.

It should be noted that the correspondence between the respective lines 3a to 3c and the projection unit 10 is not limited to the above-mentioned example, and for example, a configuration in which two projection units 10 are used to project a single line pattern 3 can also be employed.

As described above, the line patterns 3 shown in FIG. 2A are projected during the forward travel of the vehicle 1.

Thus, on the normal driving mode, the front lines 3a are linear first patterns projected on the front in the traveling direction of the vehicle 1 and are generated as line patterns 3 indicating the predicted trajectories 5 of the vehicle 1. Specifically, the linear shapes of the front lines 3a are set to indicate the predicted trajectories 5 of the front wheels of the vehicle 1.

Moreover, on the normal driving mode, the rear lines 3c are linear second patterns projected on the rear in the traveling direction of the vehicle 1 and are generated as line patterns 3 indicating the passing trajectories 6 of the vehicle 1. Specifically, the linear shapes of the rear lines 3c are set to indicate the passing trajectories 6 of the rear wheels of the vehicle 1.

Moreover, on the normal driving mode, the middle lines 3b (third patterns) are used as linear lights that light up both sides of the center portion of the vehicle 1.

FIG. 3A schematically shows a scene where the normal driving mode is applied. Here, the front lines 3a indicating the predicted trajectories 5, the rear lines 3c indicating the passing trajectories 6, and the middle lines 3b serving as linear lights are respectively projected on the peripheral road surface of the vehicle 1 traveling on the travel lane at a relatively high speed.

In this manner, the line patterns 3 indicating the predicted trajectories 5, the passing trajectories 6, and the like are projected on the periphery of the vehicle 1. Accordingly, it is possible to explicitly represent a traveling direction and a past traveling path of the vehicle 1 to pedestrians outside the vehicle, drivers of other vehicles, and the like and to add a favorable visual effect to the traveling vehicle 1.

FIG. 2B shows an example of the projection patterns 2 projected on the low-speed driving mode. The upper and lower diagrams of FIG. 2B are schematic views as the vehicle 1 is viewed from the lateral side and from above.

Here, the low-speed driving mode refers to, for example, a projection mode selected when the vehicle 1 is traveling forward while slowing down. Therefore, the low-speed driving mode is used during, for example, travel where slowdown is required, such as a stopping operation, a right turn operation, a left turn operation, and a parking operation.

On the low-speed driving mode, as on the above-mentioned normal driving mode, the three types of line patterns 3, i.e., the front lines 3a, the middle lines 3b, and the rear lines 3c are projected as the projection patterns 2.

The line patterns 3 shown in FIG. 2B are projected during the forward travel of the vehicle 1 as in FIG. 2A.

Thus, on the low-speed driving mode, the front lines 3a are linear first patterns projected on the front in the traveling direction of the vehicle 1 and are generated as line patterns 3 indicating the predicted trajectories 5 of the vehicle 1.

Specifically, the linear shapes of the front lines 3a are set to indicate the predicted trajectories 5 of the front wheels of the vehicle 1.

Moreover, on the low-speed driving mode, the rear lines 3c are linear second patterns projected on the rear in the traveling direction of the vehicle 1 and are generated as line patterns 3 indicating the passing trajectories 6 of the vehicle 1. Specifically, the linear shapes of the rear lines 3c are set to indicate the passing trajectories 6 of the rear wheels of the vehicle 1.

Moreover, on the low-speed driving mode, the middle lines 3b (third patterns) are generated as line patterns 3 indicating the predicted trajectories 5 of the vehicle 1. Specifically, the middle lines 3b have the linear shapes set to indicate the predicted trajectories 5 of the rear wheels of the vehicle 1.

Accordingly, it is possible to clearly indicate to pedestrians and the like trajectories on which the rear wheels are predicted to pass when the vehicle 1 moves forward slowly. Accordingly, it is possible to lower turn crash danger in a case of the right/left turn, for example.

FIG. 3B schematically shows a driving status of a vehicle 1a in a parking area as an example of a scene where the low-speed driving mode is applied. The vehicle 1a moves forward and gets out of the parking space on the right side in the figure. In this manner, when the vehicle 1a that has stopped moves forward, the low-speed driving mode is used because it is slowdown driving.

Here, the front lines 3a indicating the predicted trajectories 5 of the front wheels the front lines 3a indicating the predicted trajectories 5 of the front wheels and the middle lines 3b indicating the predicted trajectories 5 of the rear wheels are respectively projected on the peripheral road surface of the vehicle 1a. It should be noted that in FIG. 3B, the illustrations of the rear lines 3c indicating the passing trajectories 6 of the rear wheels of the vehicle 1a are omitted.

In this manner, the line patterns 3 indicating the predicted trajectories 5 of the front wheels and the rear wheels or the like are projected on the periphery of the vehicle 1a. Accordingly, it is possible to call attention of pedestrians and sufficiently avoid the occurrence of accidents such as turn crash and contact.

Moreover, the front lines 3a may be set to indicate the vehicle width of the vehicle 1. For example, the distance between the right and left lines is set to be the maximum width of the vehicle body of the vehicle 1. This can prompt the driver to make a handle operation considering the vehicle width, for example.

FIG. 2C shows an example of the projection patterns 2 projected on the reverse mode.

Here, the reverse mode is a projection mode selected when the vehicle 1 is traveling backward (back travel). The reverse mode is used, for example, in a case of parking by moving backward in a parking operation, for example.

On the reverse mode, the three types of line patterns 3, i.e., the front lines 3a, the middle lines 3b, and the rear lines 3c are projected as the projection patterns 2 as on the above-mentioned driving modes.

The line patterns 3 shown in FIG. 2C are projected during the backward travel of the vehicle 1.

Thus, on the reverse mode, the front lines 3a are linear second patterns projected on the rear in the traveling direction of the vehicle 1. In this case, the front lines 3a are generated as line patterns 3 indicating the passing trajectories 6 of the vehicle 1. Specifically, the linear shapes of the front lines 3a are set to indicate the front wheels of the passing trajectories 6 of the vehicle 1.

Moreover, on the reverse mode, the rear lines 3c are linear first patterns projected on the front in the traveling direction of the vehicle 1. In this case, the rear lines 3c are generated as line patterns 3 indicating the predicted trajectories 5 of the vehicle 1. Specifically, the linear shapes of the rear lines 3c are set to indicate the predicted trajectories 5 of the rear wheels of the vehicle 1.

Moreover, on the reverse mode, the middle lines 3b (third patterns) are generated as line patterns 3 indicating the predicted trajectories 5 of the vehicle 1. Specifically, the middle lines 3b are set so that the linear shapes indicate the predicted trajectories 5 of the front wheels of the vehicle 1.

Accordingly, it is possible to clearly indicate to pedestrians and the like trajectories on which the front wheels are predicted to pass when the vehicle 1 moves backward. Accordingly, it is possible to lower turn crash danger in a case of parking, for example.

FIG. 3B schematically shows a driving status of the vehicle 1b in a parking area as an example of a scene where the reverse mode is applied. The vehicle 1b moves backward for parking in the parking space on the left side in the figure.

Here, the rear lines 3c indicating the predicted trajectories 5 of the rear wheels and the middle lines 3b indicating the predicted trajectories 5 of the front wheels are respectively projected on the peripheral road surface of the vehicle 1b. It should be noted that in FIG. 3B, the front lines 3a indicating the passing trajectories 6 of the front wheels of the vehicle 1b are omitted.

Since the line patterns 3 indicating the predicted trajectories 5 of the front wheels and the rear wheels or the like are projected on the periphery of the vehicle 1b as described above, it is possible to sufficiently avoid the occurrence of an accident such as turn crash and contact during back driving.

Moreover, the rear lines 3c may be set to indicate the vehicle width of the vehicle 1 as in the case of the forward movement operation. Accordingly, the driver can perform back driving or the like while checking the vehicle width.

FIG. 2D shows an example of the projection patterns 2 projected on the parking mode.

Here, the parking mode is a projection mode selected in a case where the shift position of the vehicle 1 is parking ("P"), i.e., in a case where the vehicle 1 has stopped.

On the parking mode, the above-mentioned line patterns 3 are not displayed and the lighting pattern (hereinafter, referred to as stopping patterns 7) to surround the entire periphery of the vehicle 1 are projected as the projection patterns 2. Here, a front light 7a, a lateral side light 7b, and a rear light 7c are used as the stopping patterns 7. The respective lights 7a to 7c are gradation patterns whose colors become lighter as they come away from the vehicle 1. It should be noted that the design and the like of the stopping patterns 7 are not limited.

In this manner, the projection patterns 2 include the stopping patterns 7 different from the line patterns 3. In the present embodiment, the stopping patterns 7 are other exemplary patterns.

The use of the stopping patterns 7 can represent, to pedestrians outside the vehicle and the like, that the vehicle 1 has set the shift position to be the parking and stopped, i.e., that the vehicle 1 is stationary. Accordingly, for example, pedestrians and other vehicles can pass through the periphery of the vehicle 1 without anxiety.

It should be noted that the present technology is not limited to the above-mentioned projection modes, and other modes may be set. For example, a welcome light mode for displaying a predetermined lighting pattern when the driver unlocks the vehicle 1 with a key, opens the door, or starts the engine, for example, may be set.

Figure 4:
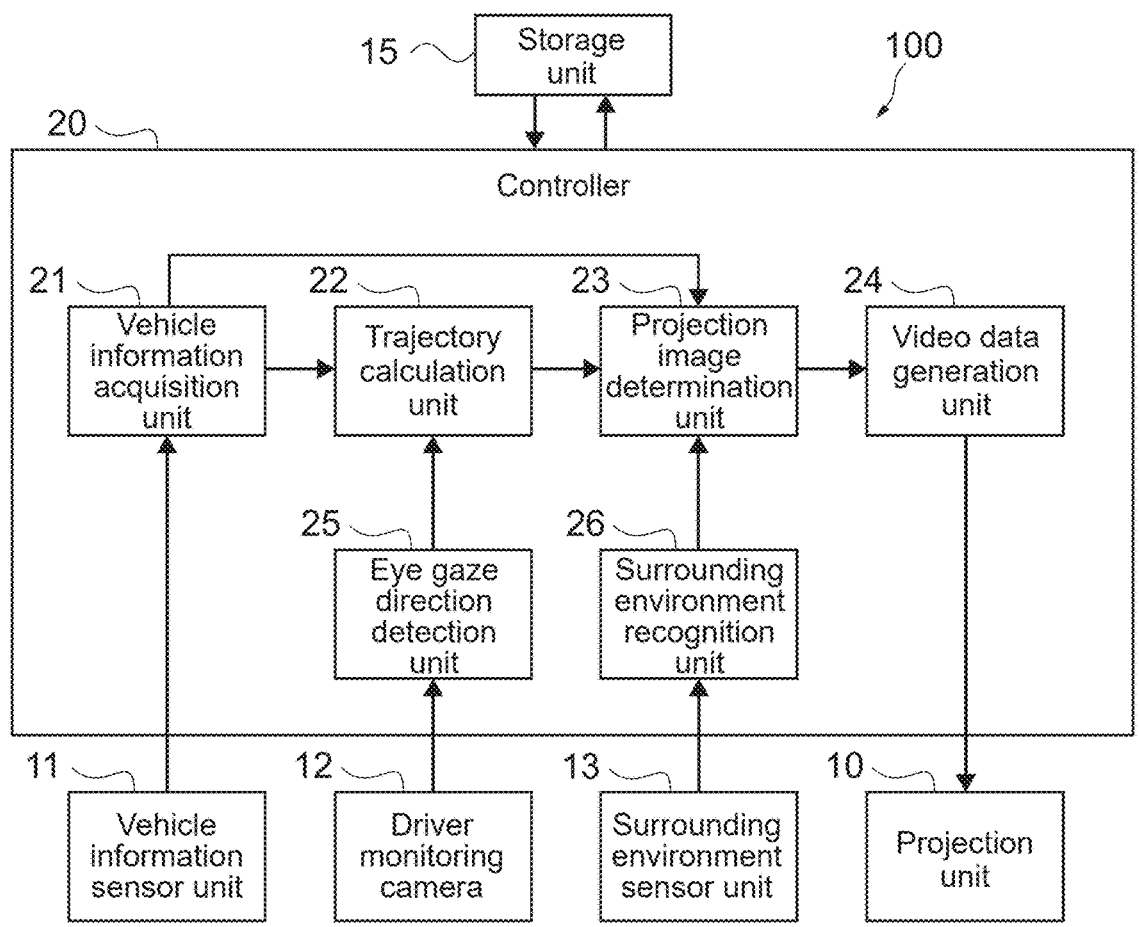
FIG. 4 A block diagram showing a configuration example of the projection apparatus according to the first embodiment.

FIG. 4 is a block diagram showing a configuration example of the projection apparatus 100 according to the first embodiment.

The projection apparatus 100 includes the above-mentioned projection unit 10, a vehicle information sensor unit 11, a driver monitoring camera 12, a surrounding environment sensor unit 13, a storage unit 15, and a controller 20.

The projection unit 10 is an element that emits light and projects the projection patterns 2. The projection unit 10 is configured to change the shapes, colors, and the like of the projection patterns 2.

For example, a projector that emits laser light as irradiation light is used as the projection unit 10. The use of laser light enables the projection patterns 2 to be displayed with high luminance at a long distance. It should be noted that an LED light source, a lamp light source, or the like may be used other than the laser light source.

A method for modulating the irradiation light is not limited. For example, a light modulator using a transmissive liquid-crystal panel, micro electro mechanical systems (MEMS), or the like is used. Moreover, combining a phase modulation element and the like using a reflective liquid-crystal panel or the like realizes projection so as to concentrate light within a predetermined range. Accordingly, the luminance of the projection patterns 2 can be increased greatly.

In addition, a specific configuration of the projection unit 10 is not limited. For example, a projection light, a laser light source, or the like capable of modulating the irradiation light may be used.

The vehicle information sensor unit 11 has a sensor that detects information regarding statuses of the respective parts of the vehicle 1.

Specifically, a steering-angle sensor that detects a steering angle of the handle, a speed sensor that detects a traveling speed of the vehicle 1, an acceleration sensor that detects an acceleration added to the vehicle 1 are provided.

Moreover, the vehicle information sensor unit 11 has an accelerator opening degree sensor that detects an opening degree of the accelerator and a brake opening degree sensor that detects an opening degree of the brake (braking level).

Moreover, the vehicle information sensor unit 11 has an accelerator pedal pressure sensor that detects a pressure of pressing on the accelerator pedal (operation force of the accelerator) and a brake pedal pressure sensor that detects a pressure of pressing on the brake pedal (operation force of the brake). These pressure sensors may be sensors that detect a general pressure value added to the pedal or may be sensors that detect a pressure distribution.

Moreover, the vehicle information sensor unit 11 has a shift position sensor that detects a position of a gear shift (shift position) and a parking brake sensor that detects on/off of a parking brake.

Moreover, an ignition sensor that detects on/off of an ignition switch, a signal light sensor that detects on/off of signal lights (direction indicators), a hazard sensor that detects on/off of hazard lights, a light sensor that detects on/off of the head lights and switching between high beam/low beam (headlight flashing), and the like may be provided.

In addition, an arbitrary sensor that detects information about the vehicle 1 may be used as the vehicle information sensor unit 11.

The driver monitoring camera 12 is a camera for imaging the driver of the vehicle 1. For example, the driver monitoring camera 12 is provided inside the vehicle 1 so as to be capable of imaging the driver from the front. For example, a digital camera equipped with an image pickup element such as a CMOS and a CCD is used as the driver monitoring camera 12.

In the present embodiment, as will be described later, the image captured by the driver monitoring camera 12 is used as data for detecting an eye gaze direction of the driver.

The surrounding environment sensor unit 13 has a sensor that detects conditions of the surrounding environment of the vehicle 1.

In the present embodiment, object detection sensors for detecting objects at the periphery of the vehicle 1 are provided as the surrounding environment sensor unit 13.

For example, cameras for imaging the surroundings of the vehicle 1 are used as the object detection sensors. For example, a front camera, a rear camera, left camera, and a right camera installed at the front part, the rear part, the left side, and the right side of the vehicle 1 are used. The cameras installed on the front, rear, left, and right sides image a scene where a vehicle is traveling at the periphery of the vehicle 1, for example. Alternatively, for example, an all-round camera capable of imaging a 360-degree area around the vehicle 1 with a fisheye lens or the like may be used.

Moreover, radar sensors, ultrasonic sensors, LiDAR sensors, or the like for detecting front, rear, left, and right areas may be used as the object detection sensors. These sensors detect positions of objects located at the periphery of the vehicle 1, for example.

In addition, the type and the like of the object detection sensors are not limited. For example, the cameras may be used in combination with other distance measurement sensors and the like.

The storage unit 15 is a nonvolatile storage device. For example, a recording medium using a solid-state element such as a solid-state drive (SSD) or a magnetic recording medium such as a hard disk drive (HDD) is used as the storage unit 15. In addition, the type and the like of the recording medium used as the storage unit 15 are not limited. For example, any recording medium for recording non-transitory data may be used.

The storage unit 15 stores a control program for controlling a general operation of the projection apparatus 100. The control program corresponds to a program according to the present embodiment. Moreover, the storage unit 15 functions as a computer-readable recording medium on which the program has been recorded.

Moreover, the storage unit 15 stores specification data for specifying the shapes, colors, and the like of the projection patterns 2. In addition, the type and the like of the data stored in the storage unit 15 are not limited, and any data required for the operation of the projection apparatus 100 may be stored.

The controller 20 controls operations of the respective blocks of the projection apparatus 100. The controller 20 has hardware configurations required for a computer, such as a CPU and a memory (RAM, ROM), for example. By the CPU loading the control program stored in the storage unit 15 to the RAM and executing it, various types of processing are performed. The controller 20 functions as an information processing apparatus according to the present embodiment.

For example, a programmable logic device (PLD) such as a field programmable gate array (FPGA) or another device such as an application specific integrated circuit (ASIC) may be used as the controller 20. Moreover, for example, a processor such as a graphics processing unit (GPU) may be used as the controller 20.

In the present embodiment, by the CPU of the controller 20 executing the program according to the present embodiment, a vehicle information acquisition unit 21, a trajectory calculation unit 22, a projection image determination unit 23, and a video data generation unit 24, an eye gaze direction detection unit 25, and a surrounding environment recognition unit 26 are realized as functional blocks. Then, these functional blocks execute an information processing method according to the present embodiment. It should be noted that dedicated hardware such as an integrated circuit (IC) may be used as appropriate in order to realize the respective functional blocks. Moreover, these functional blocks may be realized by, for example, another computer capable of communicating with the controller 20.

The vehicle information acquisition unit 21 acquires information about the vehicle 1 (vehicle information) detected by the respective sensors of the vehicle information sensor unit 11.

In the present embodiment, the vehicle information acquisition unit 21 acquires speed-related information regarding the speed of the vehicle 1. The speed-related information contains information indicating a speed of the vehicle 1 and acceleration/deceleration that changes with the speed and information regarding an operation (accelerator operation/brake operation) that changes their physical quantities.

Speed information indicating the speed of the vehicle 1 and acceleration information indicating the acceleration of the vehicle 1 are acquired as the speed-related information. For example, detection results of the speed sensor and the acceleration sensor are read as the speed information and the acceleration information.

Moreover, accelerator information and brake information are acquired as the speed-related information. The accelerator information of them contains an opening degree of the accelerator and a pressure of pressing on the accelerator pedal (operation force of the accelerator). The brake information contains an opening degree of the brake and a pressure of pressing on the brake pedal (operation force of the brake). For example, detection results of the accelerator opening degree sensor and the accelerator pedal pressure sensor are read as the opening degree and operation force of the accelerator. Moreover, detection results of the brake opening degree sensor and the brake pedal pressure sensor are read as the opening degree and operation force of the brake.

Moreover, the vehicle information acquisition unit 21 acquires traveling status information regarding a traveling status of the vehicle 1. Gear shift information and parking brake information are acquired as the traveling status information. The gear shift information of them contains information indicating a status of the shift position of the vehicle 1. Moreover, the parking brake information contains information indicating a status of the parking brake of the vehicle 1. For example, detection results of the shift position sensor and the parking brake sensor are read as the gear shift information and the parking brake information.

Moreover, the vehicle information acquisition unit 21 acquires steering angle information indicating a steering angle of the handle. For example, a detection result of the steering-angle sensor is read as the steering angle information.

Moreover, the vehicle information acquisition unit 21 acquires signal light information (direction indicator information) regarding a signal light operation. The signal light information is information indicating on/off of the right and left indicators.

In addition, detection results of the respective sensors that constitute the vehicle information sensor unit 11 are acquired as appropriate.

The trajectory calculation unit 22 calculates the predicted trajectories 5 and the passing trajectories 6 of the vehicle 1 (see FIGS. 2 and 3).

In the present embodiment, the trajectory calculation unit 22 estimates the predicted trajectories 5 on which the vehicle 1 is predicted to pass on the basis of the steering angle information, the speed information, and the acceleration information of the vehicle 1. Here, for example, the trajectories of the front wheels (or the rear wheels) that are predicted in a case where the vehicle 1 goes forward at current steering angle, speed, and acceleration are estimated. At that time, correction may be made as appropriate in accordance with centrifugal force, wheel-gripping force, and the like.

It should be noted that for example, a trajectory of the center of the vehicle 1 may be estimated instead of the predicted trajectories 5 of the wheels.

A method of estimating the predicted trajectories 5 is not limited. For example, techniques such as trajectory prediction used for self-driving and the like can be applied.

Moreover, in the present embodiment, the passing trajectories 6 on which the vehicle 1 has passed are calculated by recording behaviors of the vehicle 1. Here, the passing trajectories 6 of the front wheels (or the rear wheels) are calculated from the records of the steering angle, speed, and acceleration of the vehicle 1. For example, techniques such as dead reckoning can be used for this processing. Alternatively, GPS position measurement, Wi-Fi position measurement, and the like may be used.

Alternatively, for example, recorded predicted trajectories 5 may be used as the passing trajectories 6.

A method of estimating the passing trajectories 6 is not limited. For example, any processing capable of reproducing the trajectories of the vehicle 1 may be used.

In the present embodiment, the trajectory calculation unit 22 functions as a predicted trajectory calculation unit and a passing trajectory calculation unit.

The projection image determination unit 23 determines display contents and display parameters of the projection patterns 2 and outputs data about the projection patterns 2. This processing is processing of controlling the display of the projection patterns 2.

In the present disclosure, the processing of controlling the display of the projection patterns 2 is, for example, processing of setting the display parameters of the projection patterns 2. Typically, parameters such as color, width, length, and blinking of the line patterns 3 (see FIGS. 2A to 2C) are set.

In the projection apparatus 100, the projection image determination unit 23 controls, on the basis of the surrounding environment information, the display of the projection patterns 2 projected on the peripheral road surface of the vehicle 1 from the projection unit 10 mounted on the vehicle 1. The surrounding environment information is information acquired by the surrounding environment recognition unit 26 to be described later on the basis of the output of the surrounding environment sensor unit 13. The surrounding environment information is information indicating conditions of a peripheral road, other vehicles, and the like.

As described above, the first and second patterns (here, the front lines 3a and the rear lines 3c) of the projection patterns 2 contain a pair of lines projected on the left and right sides of the vehicle.

In the present embodiment, the projection image determination unit 23 controls, on the basis of the surrounding environment information, the display of target lines of the first patterns (front lines 3a), which are projected on the side of a target lane to which a lane change of the vehicle 1 is to be performed.

Here, the lane change is a driving operation of moving from the lane on which the vehicle is traveling to the next lane across a boundary line for division between the lanes. The lane change includes a driving operation of changing a lane while the vehicle is traveling on a plurality of lanes, a driving operation of entering a lane to merge at a merge lane, a driving operation of entering the side of a street, and the like. The target lane is a lane in a movement direction in that driving operation.

The projection image determination unit 23 controls display parameters of a target line of the front lines 3a, which is projected on the side closer to the target lane, by using information (surrounding environment information) regarding a vehicle traveling at the periphery of the vehicle 1, for example.

The surrounding environment information and the contents of display control of the target line will be described later in detail.

Moreover, the projection image determination unit 23 controls the shapes of the line patterns 3 to indicate the trajectories (predicted trajectories 5 and passing trajectories 6) of the vehicle 1 calculated by the trajectory calculation unit 22.

Specifically, the projection image determination unit 23 generates first patterns indicating the predicted trajectories 5. That is, the shapes of the front lines 3a are set to be shapes along the predicted trajectories 5.

Moreover, the projection image determination unit 23 generates second patterns indicating the passing trajectories 6. That is, the shapes of the rear lines 3c are set to be shapes along the passing trajectories 6.

Moreover, a distance between the left and right lines of the front lines 3a (or the rear lines 3c) may be set to indicate the vehicle width of the vehicle.

In the present embodiment, the projection image determination unit 23 corresponds to a projection control unit.

The video data generation unit 24 generates video data to be output to each projection unit 10 on the basis of the data about the projection patterns 2 output from the projection image determination unit 23.

For example, the frame image indicating the shapes of the projection patterns 2 as viewed from above the vehicle 1 is generated. Processing of correcting a distortion, deviated brightness, and the like caused due to projection is performed on this frame image in accordance with the projection angle or the like of each projection unit 10. A series of frame images whose distortions and the like have been corrected in this manner is the video data.

In addition, any image processing or the like for projecting the projection patterns 2 may be performed as appropriate.

The eye gaze direction detection unit 25 detects an eye gaze direction of the driver on the basis of a driver image captured by the driver monitoring camera 12. A method of detecting the eye gaze direction is not limited. For example, pupil tracking for detecting an eye gaze on the basis of an orientation of a pupil (iris and pupil) of the driver is used. In addition, any method capable of detecting the eye gaze direction with the driver image may be used.

Moreover, an orientation of the driver's face or the like may be detected instead of the eye gaze direction. In this case, an angle when the driver turns the face to the left or right or the like is detected.

The eye gaze direction detection unit 25 outputs eye gaze information indicating the eye gaze direction of the driver or face orientation information indicating the orientation of the driver's face to the projection image determination unit 23.

Figure 5:
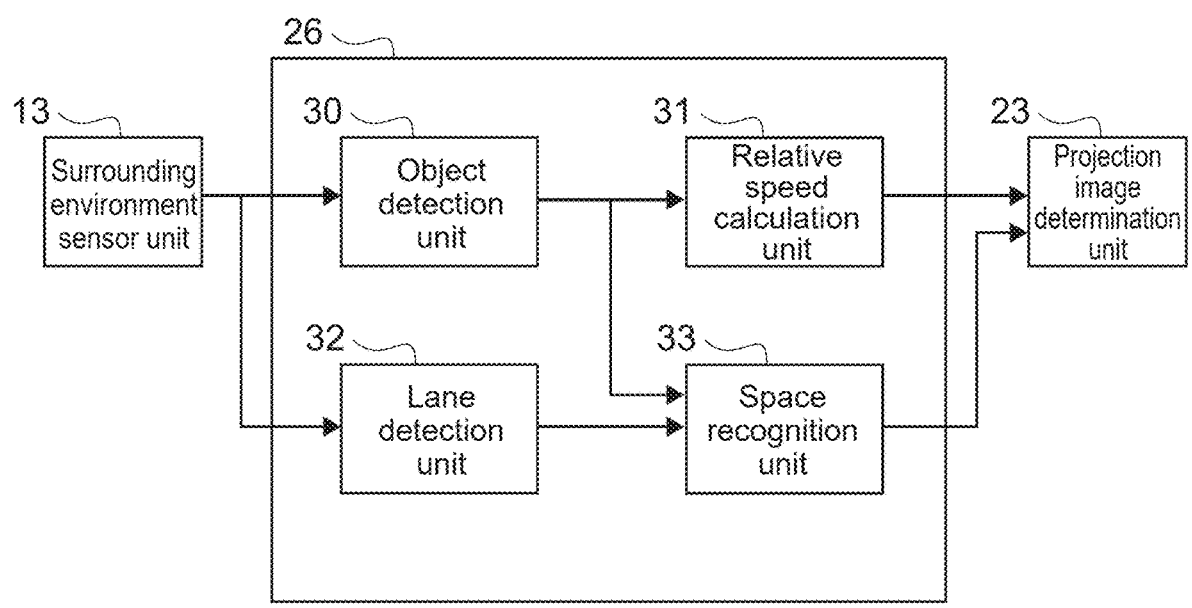
FIG. 5 A block diagram showing a configuration example of a surrounding environment recognition unit.

FIG. 5 is a block diagram showing a configuration example of the surrounding environment recognition unit 26.

The surrounding environment recognition unit 26 performs recognition processing related to the surrounding environment of the vehicle 1 on the basis of the output of the surrounding environment sensor unit 13. Then, the surrounding environment recognition unit 26 detects objects (e.g., pedestrians, other vehicles, curbs) located at the periphery of the vehicle 1 and calculates various types of information (surrounding environment information) regarding the surrounding environment. That is, the surrounding environment recognition unit 26 calculates and acquires the surrounding environment information regarding the surrounding environment of the vehicle.

In the present embodiment, the surrounding environment recognition unit 26 corresponds to an acquisition unit.

As shown in FIG. 5, the surrounding environment recognition unit 26 includes an object detection unit 30, a relative speed calculation unit 31, a lane detection unit 32, and a space recognition unit 33.

The object detection unit 30 detects an object at the periphery of the vehicle 1 on the basis of detection results of the surrounding environment sensor unit 13. For example, a learning device that performs image recognition processing by machine learning or the like is used as the object detection unit 30.

For example, in a configuration in which the cameras are provided as the surrounding environment sensor unit 13, images captured by the cameras are input to the object detection unit 30.

In this case, reference information generated by learning in advance is used to detect objects in the input image and determine their attributes. The reference information is, for example, dictionary information stored with types of objects associated with features. Moreover, in a case where deep neural network (DNN) or the like is used as the learning device, recognition model information or the like is used as the reference information. In this processing, objects at the periphery of the vehicle 1 are detected and attributes of the objects such as cars (e.g., car types including passenger cars, large-sized cars such as trucks and buss), motorcycles, bicycles, and people are determined. For example, IDs as serial numbers are applied to the detected objects, respectively.

Moreover, for each of the detected objects, its position in the image is determined. At that time, a distance (relative distance) between the position in the image and the object may be calculated.

The object detection unit 30 outputs ID information, attribute information, distance information, and position information regarding each object.

On the basis of the information regarding each of the objects output from the object detection unit 30, the relative speed calculation unit 31 calculates a relative speed of the object with respect to the vehicle 1.

For example, regarding each object, a change in distance per unit time is calculated and the relative speed with respect to that vehicle (the vehicle 1) is calculated on the basis of the change in the distance.

The relative speed calculation unit 31 outputs the ID information, the attribute information, the distance information, the position information, and the speed information regarding each object.

The lane detection unit 32 detects a lane on the road on which the vehicle 1 is traveling. Processing of recognizing white lines (boundary line for separation between road lanes) or processing of detecting curbs is performed by detection processing or the like on the basis of the road images captured by the cameras provided at the front, rear, left, and right of the vehicle 1, for example. The region between the white lines, curbs, or the like is detected as the travel lane on which the vehicle 1 travels. In addition, an adjacent lane adjacent to a travel lane 40, a region on the side of the street, or the like may be detected.

The lane detection unit 32 outputs information indicating the region of the lane.

The space recognition unit 33 recognizes a situation in a peripheral space of the vehicle 1 on the basis of detection results of the object detection unit 30 and the lane detection unit 32.

Specifically, the adjacent lane is determined from information regarding the travel lane output from the lane detection unit 32 or the like. Moreover, information regarding positions, sizes, and the like of other vehicles traveling on the adjacent lane is extracted from the output of the object detection unit 30. Then, position and size of the free space are calculated using the extracted information. Here, the free space is, for example, a space where no other vehicles exist.

Moreover, using information regarding the position and size of the free space, whether there is a space where that vehicle 1 can perform a lane change (i.e., a movement-allowing space on the target lane that the vehicle 1 can enter) is determined. Such a determination result is output as information regarding the presence/absence of the movement-allowing space.

Moreover, the presence/absence of objects (typically other vehicles) located at the travel lane of the vehicle 1, next to the vehicle 1, or on a lane next to the travel lane of the vehicle 1 is determined. Then, information regarding an object on each lane is calculated as lane situation information.

The space recognition unit 33 outputs free space information (position and size), information indicating the presence/absence of the movement-allowing space, and the lane situation information.

In the present embodiment, as shown in FIG. 5, the outputs of the relative speed calculation unit 31 and the space recognition unit 33 are final outputs of the surrounding environment recognition unit 26. Thus, the surrounding environment recognition unit 26 outputs information regarding the ID information, the attribute information, the distance information (relative distance), the position information, and the speed information (relative speed) with respect to the object. In addition, the free space information, the information indicating the movement-allowing space, and the lane situation information are output. All such information corresponds to the surrounding environment information.

Moreover, in a case where a radar sensor, an ultrasonic sensor, a LiDAR sensor, or the like other than the cameras is used as the surrounding environment sensor unit 13, position and distance of the object are detected by the object detection unit 30 and an ID is applied to the detected object. At this time, the attribute information of the object is not output.

Then, the relative speed calculation unit 31 calculates a relative speed of the detected object. In this case, the output of the surrounding environment recognition unit 26 (the relative speed calculation unit 31) is the ID information, the distance information, the position information, and the speed information of the object. It should be noted that in a case where the radar sensor is used, not only object detection but also relative speed detection can also be performed on the basis of its output.

Figure 6:
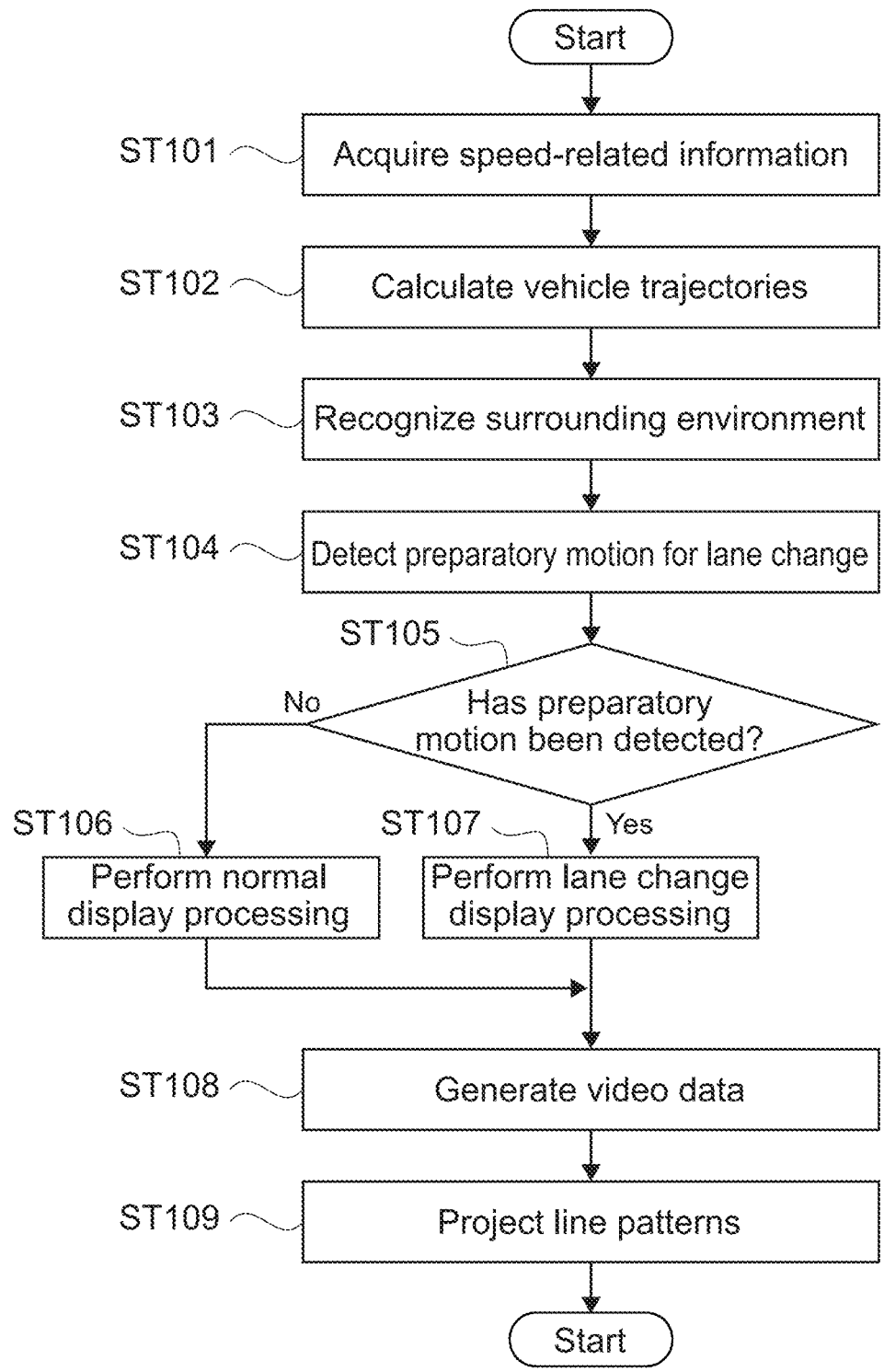
FIG. 6 A flowchart showing a basic operation example of the projection apparatus.

FIG. 6 is a flowchart showing a basic operation example of the projection apparatus 100. The processing shown in FIG. 6 is, for example, loop processing performed repeatedly during the operation of the projection apparatus 100. Here, it is assumed that the vehicle 1 is traveling forward and the normal driving mode (or the low-speed driving mode) has been selected as the projection mode of the projection patterns 2.

First of all, the vehicle information acquisition unit 21 acquires speed-related information (Step 101).

Specifically, speed information, acceleration information, accelerator information (opening degree and operation force of the accelerator), and brake information (opening degree and operation force of the brake) are read from the sensors provided in the respective parts of the vehicle 1 as the speed-related information.

Moreover, traveling status information (gear shift information, parking brake information), steering angle information, and the like are also read at that time.

Next, the trajectory calculation unit 22 calculates trajectories (predicted trajectories 5 and passing trajectories 6) of the vehicle 1 (Step 102).

Here, as shown in FIGS. 2A and 2B, the projection mode (the normal driving mode, the low-speed driving mode) used during the forward travel has been selected, and the predicted trajectories 5 of the front wheels of the vehicle 1 and the passing trajectories 6 of the rear wheels are calculated.

Next, the surrounding environment recognition unit 26 performs various types of processing of recognizing a surrounding environment and calculates surrounding environment information (Step 103).

In the present embodiment, traffic situation information indicating a traffic situation at the periphery of the vehicle 1 including a target lane to which a lane change of the vehicle 1 is to be performed is calculated as the surrounding environment information.

The traffic situation information contains information indicating a free space of the target lane. It is the free space information and the information indicating the movement-allowing space as described above. Moreover, the traffic situation information contains arrangement information of another vehicle traveling at the periphery of the vehicle 1. It is, for example, distance information, position information, and lane situation information of an object determined as a car on the basis of the attribute information. Moreover, the traffic situation information contains information regarding a relative speed of the other vehicle with respect to the vehicle 1. It is, for example, speed information of the object determined as the car. It should be noted that in a case where no attribute information has been detected for example, position information and speed information of the object are simply detected.

Figure 7:
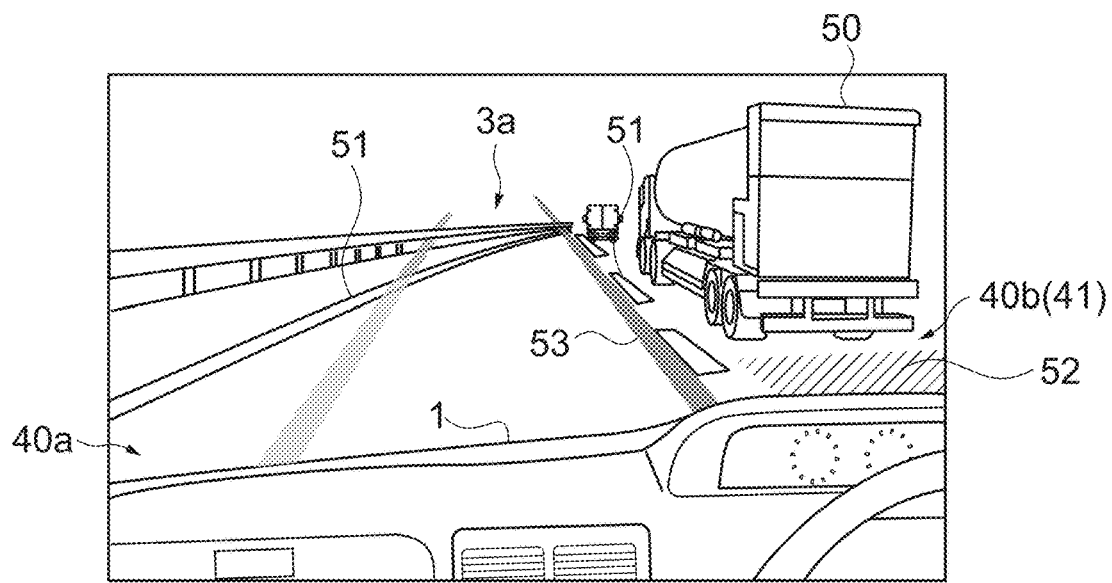
FIG. 7 A schematic view showing a status at the front of the vehicle when performing a lane change.

FIG. 7 is a schematic view showing a status at the front of the vehicle 1 when performing a lane change. Here, a travel lane 40a traveling at the vehicle 1 merges onto a right adjacent lane 40*b* of the travel lane 40*a*. Thus, at the front of the vehicle 1, the travel lane 40*a* is gradually narrowed and the driver needs to perform a lane change to (merge onto) the right adjacent lane 40*b* before arriving at the closed end of the travel lane 40*a*.

In the surrounding environment recognition unit 26, for example, the object detection unit 30 detects other vehicles 50 traveling on the adjacent lane 40. Here, trucks traveling on the right front side of the vehicle 1 is detected as one of the other vehicles 50. In addition, other vehicles 50 (not shown) on the lateral side of the vehicle 1 or behind the vehicle 1 can be detected. Then, position information, distance information, and the like regarding each of the other vehicles 50 is calculated.

Moreover, the relative speed calculation unit 31 calculates a relative speed (speed information) with respect to the vehicle 1 from the amount of movement or the like of the other vehicle 50.

Moreover, the lane detection unit 32 detects boundary lines 51 (left solid line and right dotted line) for delimiting the lane and calculates information indicating a region of the travel lane 40*a*.

In addition, the space recognition unit 33 detects an adjacent lane 40*b* adjacent to the region of the travel lane 40*a* and calculates position and size of a free space 52 (a hatched region in the figure) on the basis of the position information and the like of the other vehicle 50 on the adjacent lane 40*b*.

Moreover, the space recognition unit 33 determines whether or not there is a free space 52 with a sufficient size at a position where the vehicle 1 is movable. In the example shown in FIG. 7, for example, it is determined that the distance to the other vehicle 50 on the right front side is short and there is no space that the vehicle 1 can enter (there is no movement-allowing space).

Moreover, the space recognition unit 33 calculates lane situation information indicating information (e.g., space arrangement) of the other vehicle 50 on the adjacent lane 40*b*.

Referring back to FIG. 6, the projection image determination unit 23 detects a preparatory motion for the lane change (Step 104). The preparatory motion for the lane change is, for example, a motion made just before the driver performs the lane change. The preparatory motion for the lane change is a motion of moving the eye gaze or head in order to see the side (right side in FIG. 7) to which the driver performs the lane change.

In the present embodiment, the eye gaze direction detection unit 25 shown in FIG. 4 monitors constantly the eye gaze direction or the orientation of the driver's face. The projection image determination unit 23 tracks an eye gaze movement of the driver on the basis of detection results of the eye gaze direction detection unit 25 and detects whether or not there is a motion (preparatory motion for the lane change) of checking the left or right side through a side-view mirror or by seeing it directly.

Moreover, in a case where the preparatory motion has been detected, information indicating a check direction (left side and left side) in which the driver has visually checked it is calculated simultaneously.

Next, whether or not a preparatory motion for the lane change has been detected is determined (Step 105).

For example, in a case where the preparatory motion has not been detected (No in Step 105), the projection image determination unit 23 performs normal display processing with respect to the projection patterns 2 (Step 106).

The normal display processing is the display processing used in a case where the lane change is not performed, for example. In this processing, the left and right lines constituting the front lines 3*a* and the rear lines 3*c* are set to have the same display parameters (color, width, length, and blinking).

In a case where the preparatory motion has been detected (Yes in Step 105), the projection image determination unit 23 performs lane change display processing with respect to the projection patterns 2 (Step 107).

The lane change display processing is display processing used in a case where a lane change is performed. Specifically, display parameters of a target line of the front lines 3*a* (first patterns), which is projected on the side of a target lane to which the lane change is to be performed, are set in accordance with the above-mentioned traffic situation information (surrounding environment information).

In the example shown in FIG. 7, the right adjacent lane 40*b* of the travel lane 40*a* is a target lane 41. Moreover, a right line of the front lines 3*a*, which is closer to the target lane 41, is a target line 53.

In this manner, in the present embodiment, whether or not to perform display control of the target line 53 is determined on the basis of a change in the eye gaze direction.

It should be noted that a method of detecting the preparatory motion is not limited. A signal light operation or the like made at a certain speed or more for example may be detected as the preparatory motion. Moreover, both the change in the eye gaze direction and the signal light operation may be detected as the preparatory motion. For example, in a case where no signal light operation has been detected within a certain time after the change in the eye gaze direction is detected, the lane change display processing may be switched to the normal display processing. This prevents the front lines 3*a* from being changed unnecessarily.

The lane change display processing will be described specifically.

In the present embodiment, a change risk associated with the lane change of the vehicle 1 is estimated on the basis of the traffic situation information. The change risk is, for example, a parameter indicating the possibility that contact, collision, and the like with the other vehicles 50 may occur in a case where the vehicle 1 has performed the lane change.

For example, in a case where there is a free space 52 (movement-allowing space) where the vehicle 1 can perform a lane change, the change risk is set to be lower. On the other hand, the change risk is set to be higher as the movement-allowing space is smaller or the movement-allowing space is further. Moreover, in a case where there is no movement-allowing space, it is set to be higher than in a case where there is a movement-allowing space.

Moreover, for example, in a case where the other vehicle 50 has been detected on the adjacent lane 40, the change risk is set to be higher as the distance to the other vehicle 50 is shorter. Moreover, the change risk is set to be higher as the relative speed with respect to the other vehicle 50 located at the rear is higher. On the contrary, the change risk is set to be lower as the relative speed with respect to the other vehicle 50 located as the front is higher. Moreover, in a case where the other vehicle is located on the lateral side, the change risk is set to be higher than in a case where the other vehicle 50 is located only at the rear or the front.

For example, a total value calculated for each item is used as the change risk.

Alternatively, a cost map or the like may be generated on the basis of the arrangement and the relative speed of the other vehicle 50 and a cost value in the movement-allowing space may be estimated as the change risk.

Moreover, information regarding the signal lights and the like of the other vehicle 50, movement prediction information, and the like may be used.

Moreover, the change risk may be estimated in accordance with a situation of a lane or the like adjacent to a deep side of the target lane 41 as viewed from the vehicle 1 in addition to the situation of the target lane 41.

In addition, a method of estimating the change risk is not limited. For example, any method capable of estimating the possibility of contact or collision with the other vehicle 50 may be used.

The projection image determination unit 23 performs processing of controlling the color or blinking of the target line 53 on the basis of the change risk. Specifically, the color associated with the change risk is set as the color of the target line 53. Alternatively, in a case where the change risk has exceeded a certain value, for example, an instruction to make the target line 53 blink is output. In this case, a blinking speed and the like may be set in accordance with the change risk.

Accordingly, the driving operation for the lane change can be sufficiently supported, and the safety in the lane change can be enhanced greatly.

Figure 8:
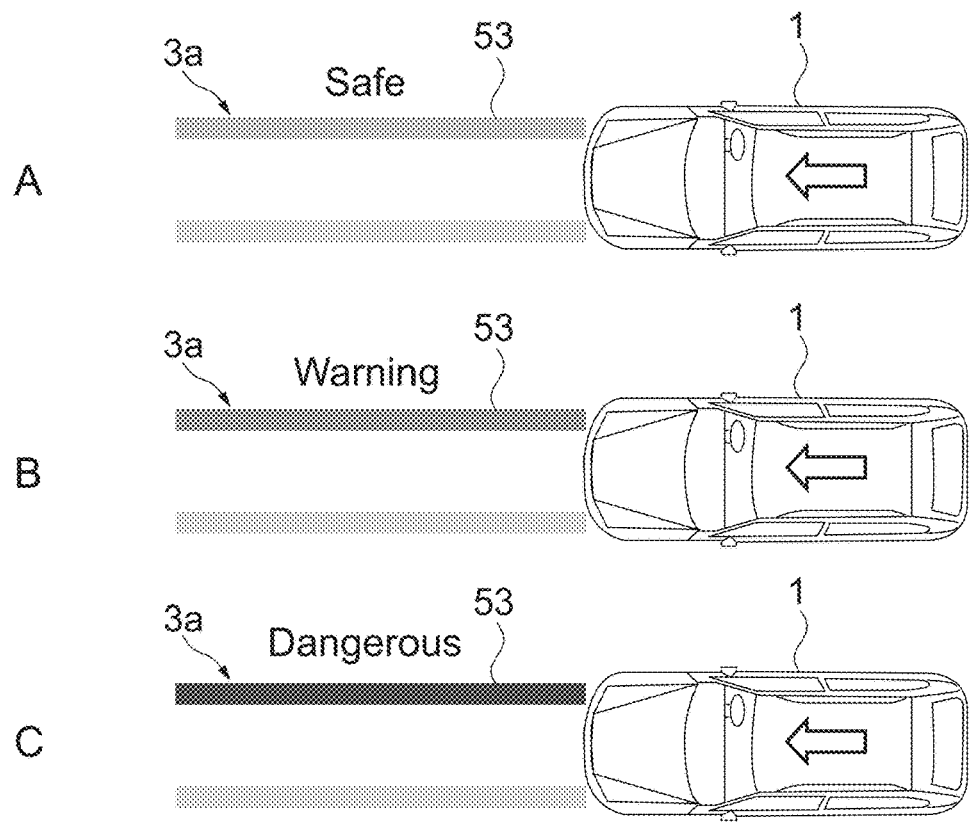
FIG. 8 A schematic view showing examples of front lines projected when performing a lane change.

FIG. 8 is a schematic view showing examples of the front lines 3*a* projected when performing a lane change. Front lines 3*a* shown in FIGS. 8A to 8C are projected in a case where the preparatory motion for the lane change has been detected. Here, a line of the front lines 3*a*, which is projected on the right side of the vehicle 1 (upper side in the figure), is the target line 53.

FIG. 8A shows front lines 3*a* projected in a case where the lane change can be performed safely. In this case, the color of the target line 53 is, for example, set to be green. It should be noted that a line on the opposite side of the target line 53 (the left line of the vehicle 1) is, for example, set to be a color (e.g., white) used in the normal display processing. The same applies to FIGS. 8B and 8C.

FIG. 8B shows front lines 3*a* projected in a case where it is necessary to be careful when changing the lane. In this case, the color of the target line 53 is, for example, set to be orange.

FIG. 8C shows front lines 3*a* projected in a case where the lane change can cause a dangerous situation. In this case, the color of the target line 53 is, for example, set to be red.

The safety level of the lane change (e.g., sage/warning/dangerous) is determined by performing threshold processing on the above-mentioned change risk, for example. For example, the safety level is determined to be "safe" in a case where the change risk is 0% to 30% of the maximum value, the safety level is determined to be "warning" in a case where the change risk is 30% to 70%, and the safety level is determined to be "dangerous" in a case where the change risk is 70% to 100%. Of course, any range and the like for determining the change risk can be set.

In this manner, in the present embodiment, the change risk is determined by a plurality of levels, and the target line 53 is set to have a different color for each of the determined levels. Accordingly, it is possible to easily recognize the safety level of the lane change while the driver is looking ahead.

Moreover, blinking or the like may be controlled in addition to the control to change the color of the target line 53. In this case, processing of making the target line 53 blink is performed when the value associated with the change risk has been exceeded. Accordingly, it is possible to reliably notify the driver of the safety level of the lane change.

In addition, processing of changing the width or length of the target line 53 in accordance with the change risk may be performed.

Moreover, in addition to the target line 53 of the front line 3*a*, the display of the middle line 3*b* and the rear line 3*c* may be controlled. Specifically, the display of the middle line 3*b* and the rear line 3*c* projected on the same side as the target line 53, i.e., the side of the target lane 41 for the lane change is controlled.

For example, at a time at which the preparatory motion for the lane change has been detected, lines of the middle lines 3*b* and the rear lines 3*c*, which are on the side of the target lane 41, are displayed to blink in orange. For example, it functions as a sign similar to direction indication with the signal lights and it is possible to represent that the vehicle 1 will perform the lane change to the other vehicle 50.

In addition, control to change the color or the like of the middle line 3*b* and the rear line 3*c* in accordance with the change risk may be performed.

Referring back to FIG. 6, when the normal display processing or the lane change display processing has completed, the video data generation unit 24 generates video data to be output to each projection unit 10 on the basis of the data about the line patterns 3 (the front lines 3*a* and the rear lines 3*c*) (Step 108). For example, a frame image showing the line patterns 3 is generated. Video data is generated by performing correction processing on this frame image in accordance with the projection angle and the like of the projection unit 10. The generated video data is output to each projection unit 10.

Then, each projection unit 10 provided in the vehicle 1 projects the corresponding line pattern 3 on the basis of the video data (Step 109). For example, the projection units 10*a* and 10*e* shown in FIG. 1 project the front lines 3*a*, the projection units 10*b*, 10*c*, 10*f*, and 10*g* project the middle lines 3*b*, and the projection units 10*d* and 10*h* project the rear lines 3*c*.

Figure 9:
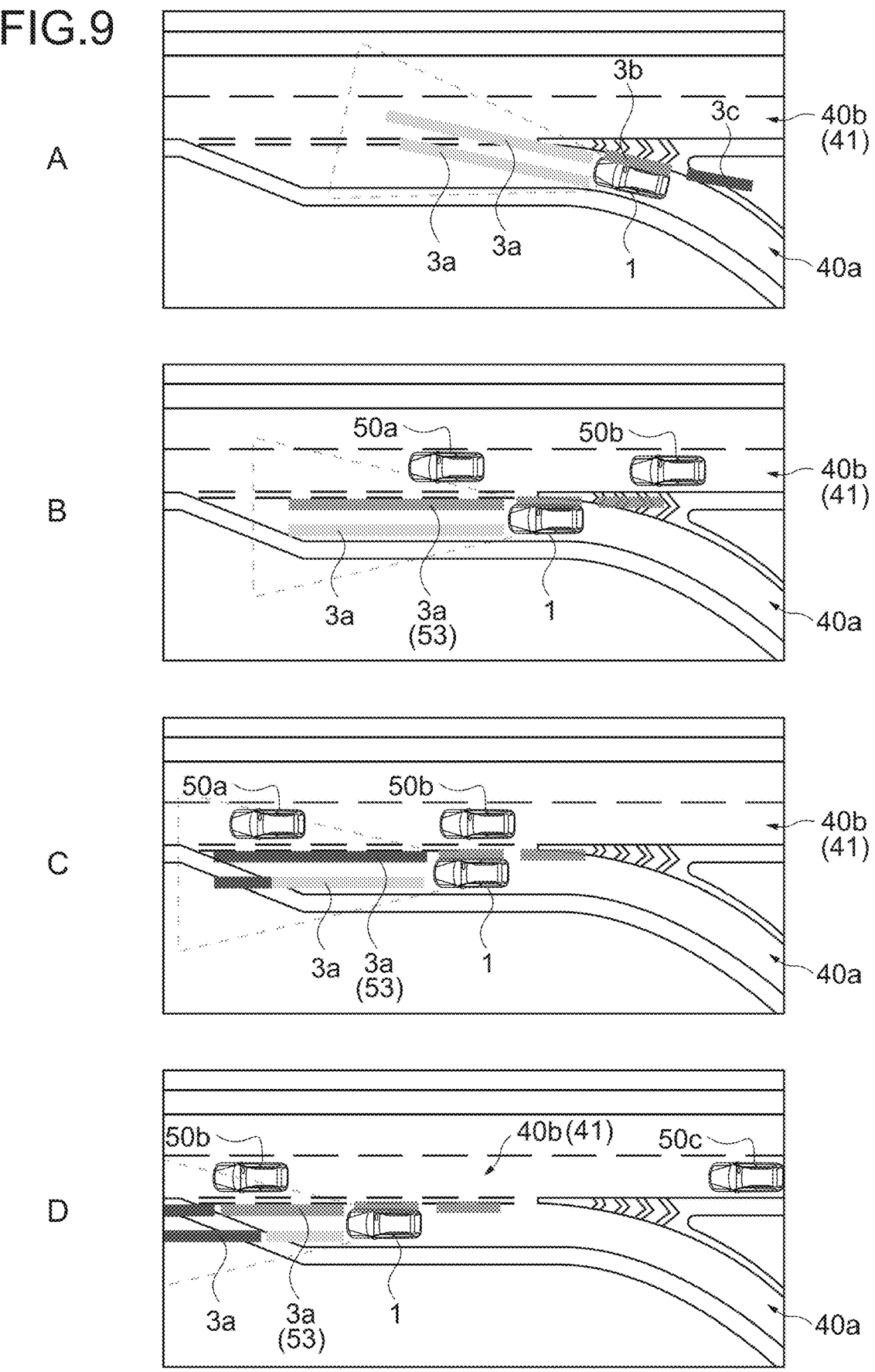
FIG. 9 A schematic view showing examples of a lane change in a merge lane.

FIG. 9 is a schematic view showing examples of a lane change in a merge lane. FIGS. 9A to 9D show processes where the vehicle 1 performs a lane change for merging onto a highway from an acceleration lane connected to the highway in order in four steps. Moreover, the dotted lines in the figure show, for example, a range in which the head lights of the vehicle 1 are radiated.

In FIG. 9A, the vehicle 1 traveling on the acceleration lane (travel lane 40*a*) is entering a merge zone where the acceleration lane and the highway are connected to each other. The highway is a two-lane road. Here, a left lane (adjacent lane 40*b*) of the highway is the target lane 41 to which the lane change is to be performed.

At a phase where the vehicle 1 has entered the merge zone, no preparatory motion for the lane change has been detected and the projection patterns 2 of the vehicle 1 are patterns set by the normal display processing. For example, the front lines 3*a* are set to be white, the middle line 3*b* is set to be blue, and the rear line 3*c* is set to be red.

In FIG. 9B, a preparatory motion for the lane change has been detected and the lane change display processing has been started. At that time, the adjacent lane 40*b* is set as the target lane 41 on the basis of a direction in which the driver gazes and a direction indicated by the signal lights.

Moreover, another vehicle 50*a* traveling on the right front side of the vehicle 1 and another vehicle 50*b* traveling on the right rear side are detected on the target lane 41. At that time, although there is a movement-allowing space on the right side of the vehicle 1, a distance to the other vehicle 50*b* is relatively short. Therefore, the change risk is determined to be a warning level. Thus, the target line 53 is set to be orange (see FIG. 8B).

On the other hand, a line of the front lines 3*a*, which is on the opposite side of the target line 53, is set to have a normal display color (white).

Moreover, since the lane change display processing has been started, the middle lines 3*b* and the rear lines 3*c* can also be changed to be orange.

In FIG. 9C, the other vehicle 50*b* that had been located on the right rear is traveling on the lateral side of the vehicle 1. Therefore, there is a high possibility that the vehicle 1 may collide with it if the vehicle 1 performs the lane change. Therefore, the change risk is determined to be a dangerous level. Thus, the target line 53 is set to be red (see FIG. 8C).

Since the red target line 53 is projected on the side to which the lane change is performed in this manner, the driver can recognize that the lane change is dangerous while looking ahead.

In FIG. 9D, the other vehicle 50*b* that had been located on the lateral side has passed the vehicle 1 and is traveling on the right front side. Moreover, another vehicle 50*c* is detected on the rear of the other vehicle 50*b*. Here, it is determined that the change risk is the safety level, considering that the position of the other vehicle C is sufficiently far and the relative speed is low. Thus, the target line 53 is set to be green (see FIG. 8C).

Accordingly, the driver can check that the lane change can be performed without changing the eye gaze direction.

Moreover, in FIG. 9D, a portion (i.e., a portion up to the end of the travel lane 40*a*) of the target line 53, which is projected within the merge zone, is set to be green, and a portion of the target line 53, which is projected further, is set to be another color (e.g., orange). The portion projected within the merge zone is a portion where the vehicle 1 can travel. Moreover, the portion far from the merge zone is a portion where the vehicle 1 cannot travel.

Figure 19:
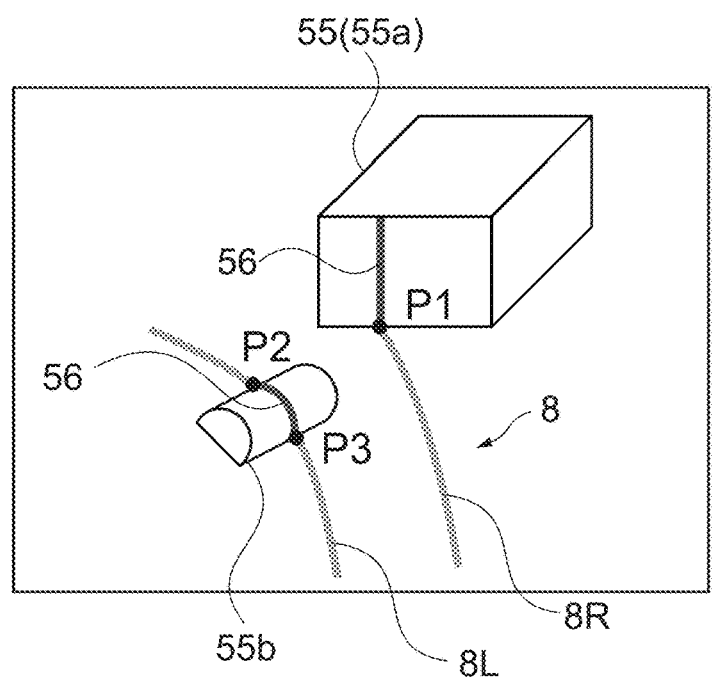
FIG. 19 A schematic view showing a display example of vehicle width lines projected on obstacles.

For example, by detecting positions at which the front lines 3*a* are distorted by obstacles (e.g., guardrails) in an image obtained by imaging the front lines 3*a*, a range allowed to travel is detected (see FIG. 19). Alternatively, the range allowed to travel may be detected from peripheral map information, GPS position measurement information, and the like.

It should be noted that in FIG. 9D, a line on the opposite side of the target line 53 is also colored by a similar method.

In this manner, in the present embodiment, the portion in which the vehicle 1 can travel on the target line 53 and the portion in which the vehicle 1 cannot travel are colored. Then, the display according to the change risk is controlled with respect to the portion in which the vehicle 1 can travel.

Accordingly, it is possible to present a distance up to the end position of the merge zone or the like to the driver, and it is possible to perform support to determine a lane change timing or the like.

Hereinabove, in the controller 20 according to the present embodiment, the projection units 10 provided in the vehicle 1 project the projection patterns 2 on the peripheral road surface. The display of the projection patterns 2 is controlled on the basis of the surrounding environment information regarding the surrounding environment of the vehicle 1. Accordingly, for example, the situation or the like where the vehicle 1 is placed can be presented to people inside and outside the vehicle 1 via the projection patterns, and the safety for driving can be enhanced.

In a case where an automobile performs a lane change or merging during driving, it is necessary to catch a distance and a relative speed with respect to a vehicle on the lateral side or diagonally rear side of the automobile and determine a lane change timing while checking the front. Moreover, such an action has to be done quickly in some traffic situations. For example, it may be difficult to determine a relative speed immediately during night time. However, gazing the lateral side or diagonally rear side can hinder the front check, and there is a danger that it may cause a traffic accident or near miss case. As one of possible methods of lowering the danger at the time of such a lane change, there is a method of displaying warning, a relative speed, and the like on a digital mirror or in-vehicle instrument panel. However, both require eye gaze movements, so there is a fear that it can still hinder the front safety check.

In the present embodiment, using information about the surrounding environment where the vehicle 1 travels, the display of the front lines 3*a* projected on the side to which the lane change is to be performed is controlled. Since the front lines 3*a* are projected on the front of the driver, the driver can check the presence/absence of a vehicle behind the driver's vehicle, a distance, a relative speed, and the like while the driver is gazing the front, and it is possible to provide a safe lane change or merging to many people.

Second Embodiment

A projection apparatus according to a second embodiment of the present technology will be described. Hereinafter, descriptions of portions having configurations and effects similar to those of the projection apparatus 100 described above in the above-mentioned embodiment will be omitted or simplified. A road surface display apparatus (attention to a following vehicle driver's problems are solved by displaying wheel trajectories on a road surface.

Figure 10:
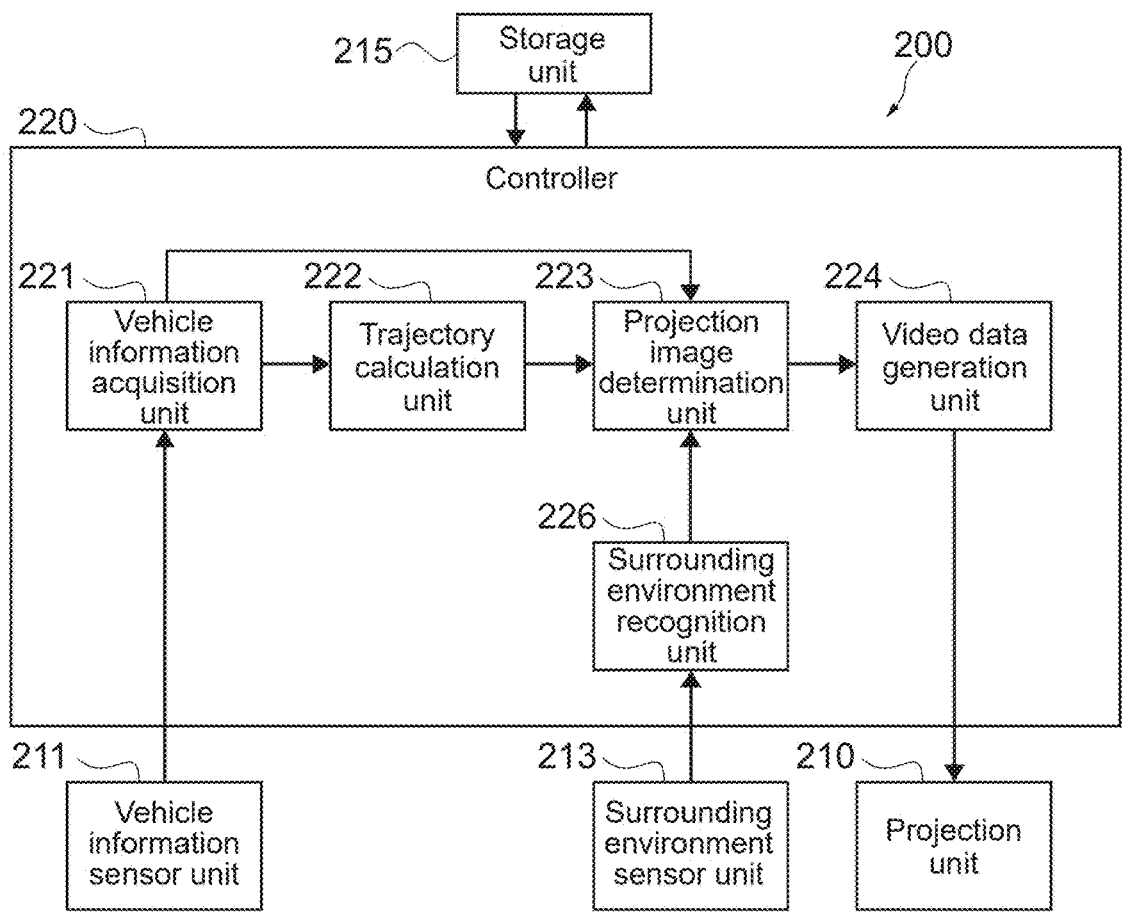
FIG. 10 A block diagram showing a configuration example of a projection apparatus according to a second embodiment.

FIG. 10 is a block diagram showing a configuration example of the projection apparatus according to the second embodiment.

In the present embodiment, the display of the second patterns projected on the rear in the traveling direction is stepwise controlled in accordance with a collision risk estimated on the basis of information (following vehicle information) regarding the following vehicle behind the vehicle 1 as display control of the projection patterns 2 using the surrounding environment information.

As shown in FIG. 10, a projection apparatus 200 includes projection units 210, a vehicle information sensor unit 211, a surrounding environment sensor unit 213, a surrounding environment sensor unit 213, a storage unit 215, and a controller 220. The projection units 210, the vehicle information sensor unit 211, and the storage unit 215 of them are, for example, configured in a manner similar to the projection unit 10, the vehicle information sensor unit 11, and the storage unit 15 shown in FIG. 4.

The surrounding environment sensor unit 213 has sensors that detect conditions of a surrounding environment of the vehicle 1.

In the present embodiment, a sensor for detecting an object at the rear of the vehicle 1 (a rear camera, a radar sensor, an ultrasonic sensor, a LiDAR sensor, or the like installed at the rear part of the vehicle 1) is provided at the rear as the surrounding environment sensor unit 213.

In addition, sensors (e.g., front camera and side cameras) may be provided as in the surrounding environment sensor unit 213 shown in FIG. 4.

The controller 220 controls operations of the respective blocks of the projection apparatus 200. In the present embodiment, by the CPU of the controller 220 executing the program according to the present embodiment stored in the storage unit 215, a vehicle information acquisition unit 221, a trajectory calculation unit 222, a projection image determination unit 223, a video data generation unit 224, and a surrounding environment recognition unit 226 are realized as functional blocks.

The vehicle information acquisition unit 221, the trajectory calculation unit 222, and the video data generation unit 224 of them are, for example, configured similar to the vehicle information acquisition unit 21, the trajectory calculation unit 22, and the video data generation unit 24 shown in FIG. 4.

The projection image determination unit 223 determines the display contents and display parameters of the projection patterns 2 and outputs data about the projection patterns 2.

In the present embodiment, the projection image determination unit 223 estimates a collision risk with the following vehicle on the basis of the following vehicle information and discontinuously changes the second patterns in accordance with the collision risk.

Here, the following vehicle information is the information regarding the following vehicle traveling on the rear of the vehicle 1. The following vehicle information is the surrounding environment information calculated by the surrounding environment recognition unit 226 to be described later.

Moreover, the collision risk is a parameter indicating a possibility that the following vehicle may collide with the vehicle 1 or the like.

The projection image determination unit 223 sets the display parameters of the second patterns to change stepwisely in accordance with a collision risk level, for example.

Figure 11:
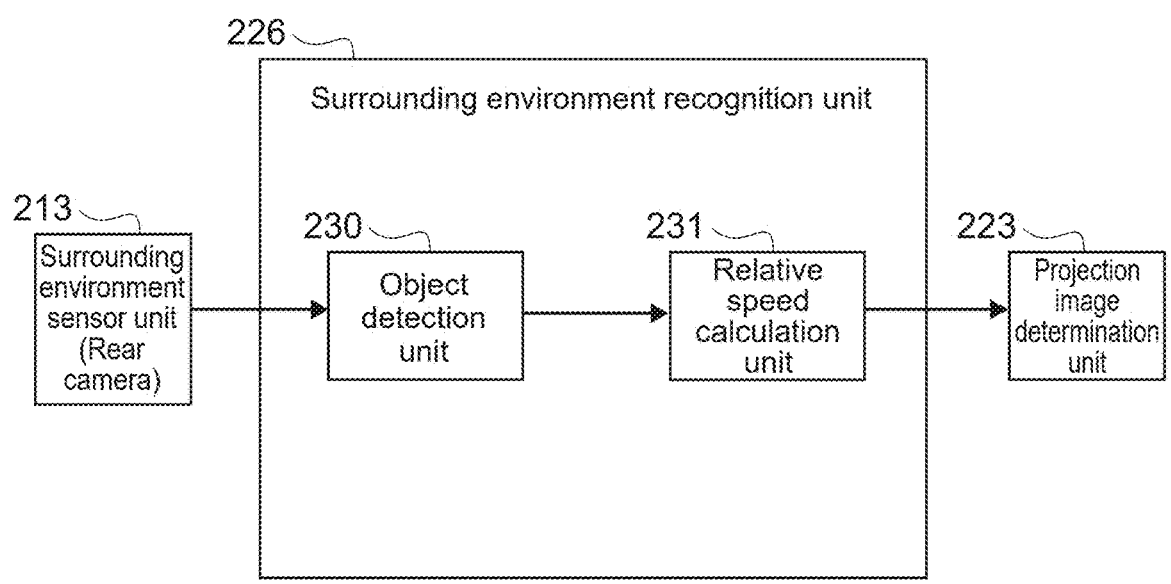
FIG. 11 A block diagram showing a configuration example of a surrounding environment recognition unit.

FIG. 11 is a block diagram showing a configuration example of the surrounding environment recognition unit 226.

The surrounding environment recognition unit 226 performs recognition processing related to the surrounding environment of the vehicle 1 on the basis of the output of the surrounding environment sensor unit 213. Then, the surrounding environment recognition unit 226 detects objects (e.g., pedestrians, other vehicles, curbs) located at the periphery of the vehicle 1 and calculates various types of information regarding the objects.

The surrounding environment recognition unit 226 includes an object detection unit 230 and a relative speed calculation unit 231. The object detection unit 230 detects distance information, position information, and the like of the objects at the periphery of the vehicle 1. The relative speed calculation unit 231 detects a relative speed of each object with respect to the vehicle 1.

The object detection unit 230 and the relative speed calculation unit 231 are configured similar to the object detection unit 30 and the relative speed calculation unit 31 shown in FIG. 4, for example.

In the present embodiment, the object detection unit 230 detects one of the objects at the periphery of the vehicle 1, in particular, a following vehicle behind the vehicle 1, and calculates its distance information and position information. Then, the relative speed calculation unit 231 calculates a relative speed of the following vehicle.

That is, the surrounding environment recognition unit 226 calculates following vehicle information regarding a following vehicle behind the vehicle 1 on the basis of detection results of the rear camera and the like. Thus, the surrounding environment recognition unit 226 calculates and acquires the following vehicle information. The following vehicle information contains ID information of the following vehicle, attribute information, distance information indicating a vehicle-to-vehicle distance (or position information indicating a relative position), and speed information indicating a relative speed. It should be noted that the following vehicle includes an automobile, a motorcycle, a bicycle, and the like.

Figure 12:
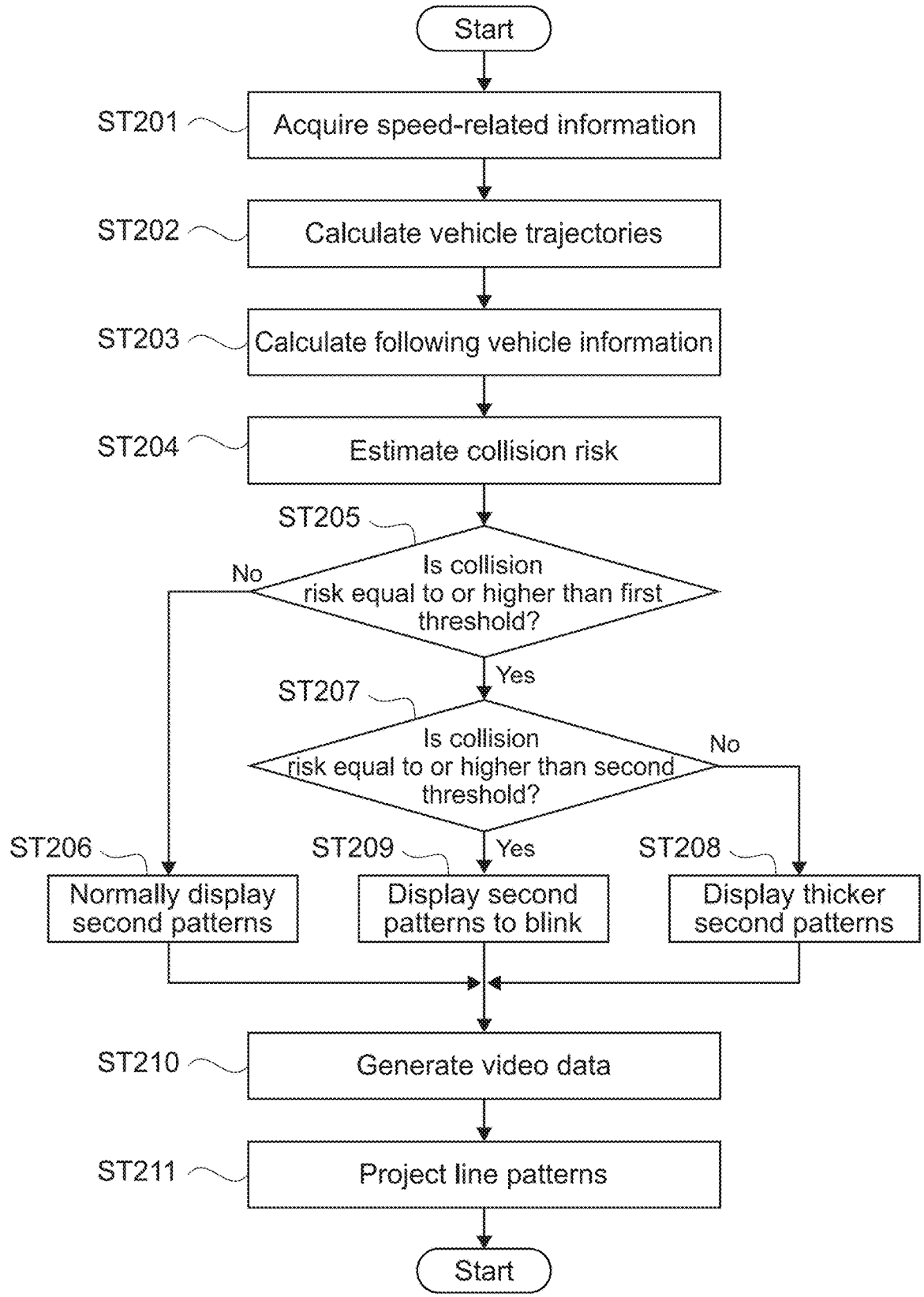
FIG. 12 A flowchart showing a basic operation example of the projection apparatus.

FIG. 12 is a flowchart showing a basic operation example of the projection apparatus 200. FIG. 13 is a schematic view showing examples of rear patterns according to a collision risk.

The processing shown in FIG. 12 is, for example, a loop processing performed repeatedly during the operation of the projection apparatus 200. Moreover, this processing may be performed, in a case where the following vehicle has been detected, in a case where the relative speed of the following vehicle is high, or in a case where the vehicle-to-vehicle distance to the following vehicle is short, for example.

First of all, the vehicle information acquisition unit 221 acquires speed-related information (Step 201). After that, the trajectory calculation unit 222 calculates trajectories (predicted trajectories 5 and passing trajectories 6) of the vehicle 1 (Step 202). Then, the surrounding environment recognition unit 226 detects a following vehicle and calculates following vehicle information (Step 203).

Next, the projection image determination unit 223 estimates a collision risk (Step 204).

The collision risk is set to have a higher value, for example, as the relative distance to the following vehicle is shorter or as the relative speed with respect to the following vehicle is higher. As an example, the relative speed/the relative distance is calculated as the collision risk. Alternatively, the collision risk may be calculated on the basis of either one of the relative distance and the relative speed. Alternatively, a collision risk considering the amount of deceleration of that vehicle 1 and the like may be calculated referring to the brake information or the like.

Next, whether or not the collision risk is equal to or higher than a first threshold is determined (Step 205). The first threshold is, for example, a threshold for detecting a case where the collision risk is relatively high. The first threshold is, for example, set to have a value that is approximately 30% to 50% of the maximum value of the collision risk.

In addition, the first threshold can be set as appropriate.

In a case where the collision risk is lower than the first threshold (No in Step 205), the projection image determination unit 223 determines to project the second patterns by normal display (Step 206). The normal display is a display method (normal display processing) in a normal brake operation.

FIG. 13A schematically shows a display example of second patterns (rear lines 3c) in the normal display. Here, the rear lines 3c with a relatively short width set are projected. Moreover, the rear lines 3c are set to be red similar to the color of brake lights 35, for example.

Referring back to FIG. 12, in a case where the collision risk is equal to or higher than the first threshold (Yes in Step 205), whether or not the collision risk is equal to or higher than a second threshold is determined (Step 207). The second threshold is, for example, a threshold for detecting a status in which the collision risk is sufficiently high. For example, a value that is 50% or more of the maximum value of the collision risk is set as the second threshold.

In addition, the second threshold can be set as appropriate.

In a case where the collision risk is smaller than the second threshold (No in Step 207), the projection image determination unit 223 determines to display the widths of the second patterns to have a relatively long fixed width (Step 208). It can be said that this method is a method of displaying the second patterns in a statically noticeable manner. For example, the widths of the second patterns are set to be the maximum widths. Alternatively, the widths of the second patterns may be set to be widths that are about 90% or 80% of the maximum widths.

FIG. 13B schematically shows a display example of the second patterns (rear lines 3c) displayed with long widths. Here, the rear lines 3c set to have longer fixed widths than those of the normal display are projected. Accordingly, since the long rear lines 3c are projected in addition to the brake lights 35, it is possible to represent that the collision risk with the vehicle 1 is increasing to the following vehicle in a noticeable manner.

Referring back to FIG. 12, in a case where the collision risk is equal to or higher than the second threshold (Yes in Step 207), the projection image determination unit 223 determines to project the second patterns in blinking display (Step 209).

The blinking display is a display method of displaying the second patterns to blink. It can be said that the blinking display is a method of displaying the second patterns in a dynamically noticeable manner.

FIG. 13C schematically shows a display example of the second patterns (rear lines 3c) in blinking display. In the blinking display, for example, the widths of the rear lines 3c are set to have widths equal to or larger than the fixed widths of FIG. 13B. Then, the rear lines 3c are displayed so that at least parts of the rear lines 3c blink. Moreover, in a case where the parts of the rear lines 3c blink, the portions to blink can also be displayed to move. That is, the rear lines 3c may be displayed as animation. Accordingly, the blinking rear lines 3c are projected in addition to the brake lights 35, it is possible to represent that there is a possibility that a collision with the vehicle 1 may occur in a sufficiently noticeable manner. As a result, it is possible to effectively invoke attention to the following vehicle and the like.

Referring back to FIG. 12, in Steps 206, 208, and 209, after the display of the second patterns is set, the video data generation unit 224 generates the video data to be output to each projection unit 210 on the basis of the set data (Step 210). Then, each projection unit 210 provided in the vehicle 1 respectively projects the corresponding line patterns 3 on the basis of the video data (Step 211).

In this manner, in the present embodiment, in a case where the collision risk is equal to or higher than a first threshold and is lower than a second threshold higher than the first threshold, the projection image determination unit 223 increases the widths of the second patterns and causes the second patterns to blink in a case where the collision risk is equal to or higher than the second threshold.

Accordingly, it is possible to represent the possibility of the collision with the vehicle 1 located at the front to the following vehicle in an easy-to-understand manner.

A brake operation level or the like may be used for calculating a collision risk. For example, since the deceleration of the vehicle 1 increases as the braking level is higher, the collision risk is set to be higher. Accordingly, a collision and the like with the following vehicle can be sufficiently avoided.

In the operation example shown in FIG. 12, the discontinuous display control of the second patterns according to the collision risk has been described. The second patterns may be discontinuously controlled instead of the collision risk, for example, in accordance with the brake operation level of the vehicle 1.

Specifically, the projection image determination unit 223 estimates a brake operation level made by the driver. Then, processing of stepwisely changing the display of the rear patterns in accordance with the brake operation level is performed. This processing is, for example, processing of performing the processing shown in FIG. 12 by using the brake operation level of the vehicle 1 instead of the collision risk.

Moreover, in the processing described with reference to FIG. 12 and the like, the pattern (rear line) as warning display to the following vehicle is switched and displayed. Additionally, for example, it is also possible to emit a warning sound toward the following vehicle through a directional speaker or the like. In this case, since the auditory warning sound as well as the warning as the blinking display or the like are represented, it is possible to represent the brake operation or the collision risk effectively.

Accidents where an automobile stops and a vehicle behind the automobile crushes into the automobile for example at a signal or at the end of a traffic jam have been reported. Drivers are advised to make an operation of "making the brake lights blink by pumping the brakes" or an operation of "turning on the hazard lights" as a measure for protecting themselves from those accidents. One of possible methods for automating those operations is a method of monitoring a following vehicle behind a vehicle and making the hazard lights blink automatically if a collision may occur. However, those operations cannot provide a sufficient effect in some cases. It is thus desirable to provide an effective warning method or the like for making the driver of the following vehicle notice that the preceding vehicle is stopping.

In the present embodiment, the rear lines 3c (second patterns) displaying the trajectories of the wheels or the like are projected on the rear of the traveling vehicle 1. These second patterns are switched to the display with the increased line widths (see FIG. 13B) or to the blinking display (see FIG. 13C) in accordance with the collision risk with the following vehicle. Therefore, it is possible to induce attention to the front from the driver of the following vehicle by using not only static display but also dynamic display. Accordingly, the occurrence of a collision with the following vehicle and the like can be avoided sufficiently.

Third Embodiment

In the present embodiment, a pair of lines patterns 3 indicating the vehicle width of the vehicle 1 is projected as the first patterns (typically, the front lines 3a) projected on the front in the traveling direction of the vehicle 1. Thus, the first patterns function as extended lines of the vehicle width. Then, the display of the line patterns 3 corresponding to the vehicle width is controlled on the basis of a positional relationship between the vehicle 1 and an object at the periphery.

By displaying the extended lines of the vehicle width on the road surface in this manner, it is possible to present a distance and the like to the object at the periphery in an easy-to-understand manner, and it is possible to support the driver's vehicle width recognition.

Figure 14:
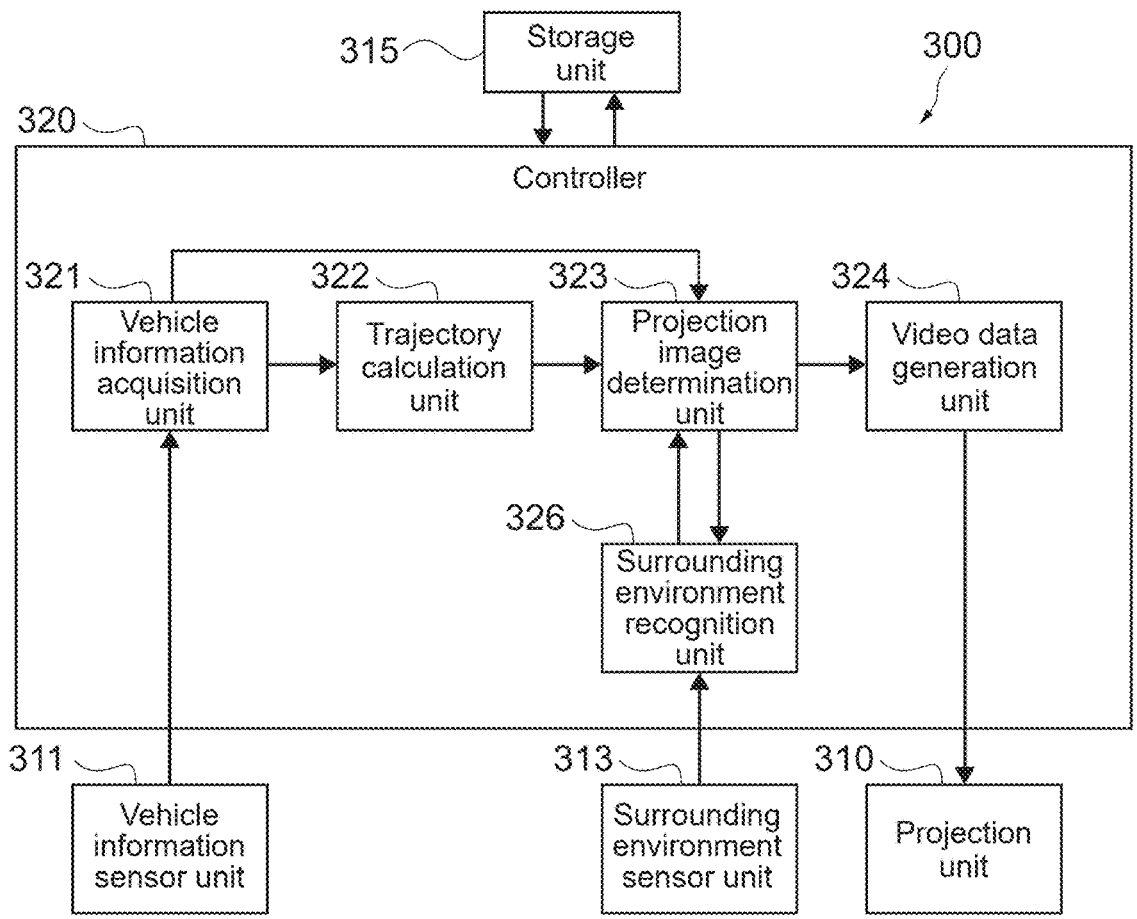
FIG. 14 A block diagram showing a configuration example of a projection apparatus according to a third embodiment.

FIG. 14 is a block diagram showing a configuration example of a projection apparatus according to a third embodiment.

As shown in FIG. 14, a projection apparatus 300 includes projection units 310, a vehicle information sensor unit 311, a surrounding environment sensor unit 313, a storage unit 315, and a controller 320. The projection units 310, the vehicle information sensor unit 311, the surrounding environment sensor unit 313, and the storage unit 315 of them are, for example, configured similar to the projection unit 10, the vehicle information sensor unit 11, the surrounding environment sensor unit 13, and the storage unit 15 shown in FIG. 4.

The controller 320 controls operations of the respective blocks of the projection apparatus 300. In the present embodiment, by the CPU of the controller 320 executing the program according to the present embodiment stored in the storage unit 315, a vehicle information acquisition unit 321, a trajectory calculation unit 322, a projection image determination unit 323, a video data generation unit 324, and a surrounding environment recognition unit 326 are realized as functional blocks.

The vehicle information acquisition unit 321, the trajectory calculation unit 322, and the video data generation unit 324 of them are, for example, configured similar to the vehicle information acquisition unit 21, the trajectory calculation unit 22, and the video data generation unit 24 shown in FIG. 4.

The projection image determination unit 323 determines the display contents and display parameters of the projection patterns 2 and outputs data about the projection patterns 2.

In the present embodiment, the projection image determination unit 323 generates a pair of lines indicating the vehicle width of the vehicle 1 as the front lines 3a (first patterns).

The vehicle width of the vehicle 1 is, for example, a maximum horizontal width of the vehicle main body. Alternatively, the horizontal width including the side-view mirrors or the like may be used as the vehicle width.

For example, in a case where the width of each of the lines constituting the front lines 3a is sufficiently thin (e.g., below 10 cm), a distance (center width) between the centers of the respective lines is set as the vehicle width of the vehicle 1. Moreover, in a case where the width of each of the lines is relatively thick (e.g., 10 cm or more), a distance (outer width) between outer edges of the respective lines with respect to the vehicle 1 is set as the vehicle width of the vehicle 1. In addition, the distance between the lines may be set in accordance with the shapes and the like of the respective lines so as to be capable of indicating the vehicle width of the vehicle 1.

It should be noted that as in the above-mentioned embodiments, the front lines 3a are set to have a shape indicating the predicted trajectories 5 of the vehicle 1.

Hereinafter, the front lines 3a indicating the vehicle width will be referred to as vehicle width lines. Moreover, the lines of the vehicle width lines (front lines 3a), which are projected on the right side and the left side of the vehicle 1, will be referred to as a right line and a left line, respectively.

In addition, the projection image determination unit 323 individually controls the display of the pair of lines on the basis of positional relationship information indicating a positional relationship between the object at the periphery of the vehicle 1 and the vehicle 1.

The positional relationship information is information capable of indicating a positional relationship between objects (e.g., other vehicles, pedestrians, curbs, guardrails, white lines on the road) located in the surrounding environment of the vehicle 1 and the vehicle 1. The positional relationship information is surrounding environment information acquired by the surrounding environment recognition unit 326. For example, a distance between the object and the vehicle 1 and a relative position and a relative direction of the object as viewed from the vehicle 1 are the positional relationship information. Moreover, the vehicle 1 and the position information of the object may be used as the positional relationship information as it is.

The projection image determination unit 323 detects approach between the vehicle 1 and the object, a deviation of the vehicle 1 with respect to the object, or the like, for example, on the basis of the positional relationship between the vehicle 1 and the object. The display parameters (typically colors and blinking) of the right and left lines are respectively set so as to indicate such a detection result. This point will be described later in detail.

Moreover, in the present embodiment, in addition to the vehicle width lines, projection patterns 2 (hereinafter, referred to as boundary line patterns) indicating the boundary lines 51 for delimiting the lane on which the vehicle 1 travels are generated. These boundary line patterns are, for example, generated using detection results of white lines detected by the lane detection unit 332 to be described later. Moreover, for example, in a case where an attitude change or the like of the vehicle 1 can be detected, processing of correcting the boundary line patterns in accordance with the attitude change of the vehicle 1 is performed.

Figure 15:
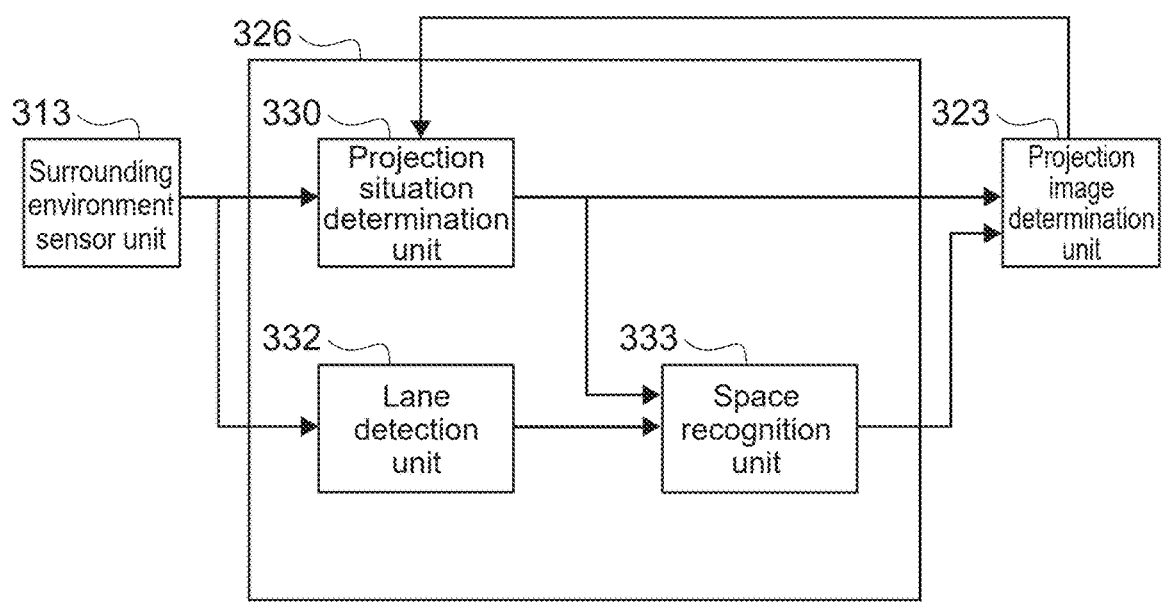
FIG. 15 A block diagram showing a configuration example of a surrounding environment recognition unit.

FIG. 15 is a block diagram showing a configuration example of the surrounding environment recognition unit 326.

On the basis of the output of the surrounding environment sensor unit 313, the surrounding environment recognition unit 326 detects objects (e.g., pedestrians, other vehicles, curbs) located at the periphery of the vehicle 1, and calculates positional relationship information regarding each object as the surrounding environment information.

As shown in FIG. 15, the surrounding environment recognition unit 326 includes a projection situation determination unit 330, a lane detection unit 332, and a space recognition unit 333.

The projection situation determination unit 330 detects vehicle width lines from a front image. This front image is captured by the front camera with the vehicle width lines (projection patterns 2) projected.

In the processing of detecting the vehicle width lines, data (e.g., shape, color, width, length, and blinking) about the vehicle width lines (front lines 3a) output from the projection image determination unit 323 is used. Accordingly, the vehicle width lines shown in the front image can be detected accurately.

Also, the projection situation determination unit 330 detects boundary line patterns from the front image.

Moreover, the projection situation determination unit 330 determines conditions at the front of the vehicle 1 on the basis of how the detected vehicle width lines are projected on the road surface. For example, in a case where the vehicle width lines are projected with no distortion (e.g., with no diffraction), it is determined that the road surface at the front is flat. Alternatively, in a case where the vehicle width lines are distorted, it is determined that there is an obstacle at the front.

In a case where it is determined that there is an obstacle, information indicating the distorted portions of the right and left lines constituting the vehicle width lines is calculated. Specifically, a position of the bent portion of each line (e.g., a position corresponding to ¼ from the end) is calculated.

This information is positional relationship information indicating a relative position of the obstacle with respect to the vehicle 1.

In this manner, the projection situation determination unit 330 detects, as the positional relationship information, the distortions of the lines from the image (front image) obtained by imaging the lines (right and left lines), thereby detecting a position of the obstacle on the line. By using the distortions of the lines in the image obtained by imaging the lines, the obstacle located on the traveling route of the vehicle 1 can be easily detected.

In the present embodiment, the projection situation determination unit 330 corresponds to a second detection unit.

The projection situation determination unit 330 outputs the detection results (vehicle width lines and boundary line patterns) of the front projection patterns 2 and the relative position of the obstacle.

The lane detection unit 332 is, for example, configured similar to the lane detection unit 32 shown in FIG. 5 and detects the lane on the road on which the vehicle 1 is traveling. More specifically, processing of detecting objects such as the white lines on the road or curbs is performed and their positions are detected. The white lines or curbs are boundary lines 51 indicating a range within which the vehicle 1 should travel. Thus, it can be said that the lane detection unit 332 detects relative positions of the boundary lines 51 as the positional relationship information of the objects.

The space recognition unit 333 recognizes a situation in a peripheral space of the vehicle 1 on the basis of the detection results of the projection situation determination unit 330 and the lane detection unit 332.

In the present embodiment, distances between the boundary lines 51 and the vehicle width lines are calculated on the basis of the position information of the boundary lines 51 of the travel lane 40 on which the vehicle 1 is traveling and the position information of the vehicle width lines. For example, a distance between the right line and the boundary line 51 on the right side of the vehicle 1 and a distance between the left line and the boundary line 51 on the left side of the vehicle 1 are each calculated. This processing is performed on the basis of the front image obtained by imaging an area at the front of the vehicle 1.

In this manner, the space recognition unit 333 detects, from the image obtained by imaging the boundary lines 51 and the lines (right and left lines) simultaneously, distances between the boundary lines 51 and the lines. By using the image obtained by imaging both the boundary lines 51 and the lines, the distance between the respective lines can be easily calculated.

In the present embodiment, the space recognition unit 333 corresponds to a first detection unit.

The distance between the boundary line 51 and the line indicating the vehicle width indicate a distance of the vehicle 1 to the lane, i.e., a distances between the vehicle 1 and the boundary line 51. The space recognition unit 333 determines whether each of these distances is equal to or shorter than a predetermined threshold.

Moreover, from the position information between the boundary lines 51 of the travel lane and the boundary line patterns, the space recognition unit 333 calculates an amount of deviation of the boundary line patterns with respect to the actual boundary lines 51 (white lines or curbs). This amount of deviation is used for calibrating the positions of the boundary line patterns in the projection image determination unit 323.

The space recognition unit 333 outputs the distances between the boundary lines 51 and the lines and the determination results, and the amount of deviation of the boundary line patterns.

In the present embodiment, as shown in FIG. 15, the outputs of the projection situation determination unit 330 and the space recognition unit 333 are final outputs of the surrounding environment recognition unit 326. Thus, the surrounding environment recognition unit 326 outputs projection situation information (information indicating whether or not the vehicle width lines are distorted and position information of the distorted portions (obstacle)). Moreover, the distances between the boundary lines 51 and the lines and the determination results, and the amount of deviation of the boundary line patterns are output.

It should be noted that a method of detecting the position and the like of the object at the periphery of the vehicle 1 is not limited. For example, a simultaneous localization and mapping (SLAM) technology of generating a 3D map of the surrounding environment of the vehicle 1 by itself may be used.

Moreover, the object detection unit shown in FIG. 5 or the like may be provided and the position and distance of the object may be detected using a radar sensor, an ultrasonic sensor, a LiDAR sensor, or the like.

Figure 16:
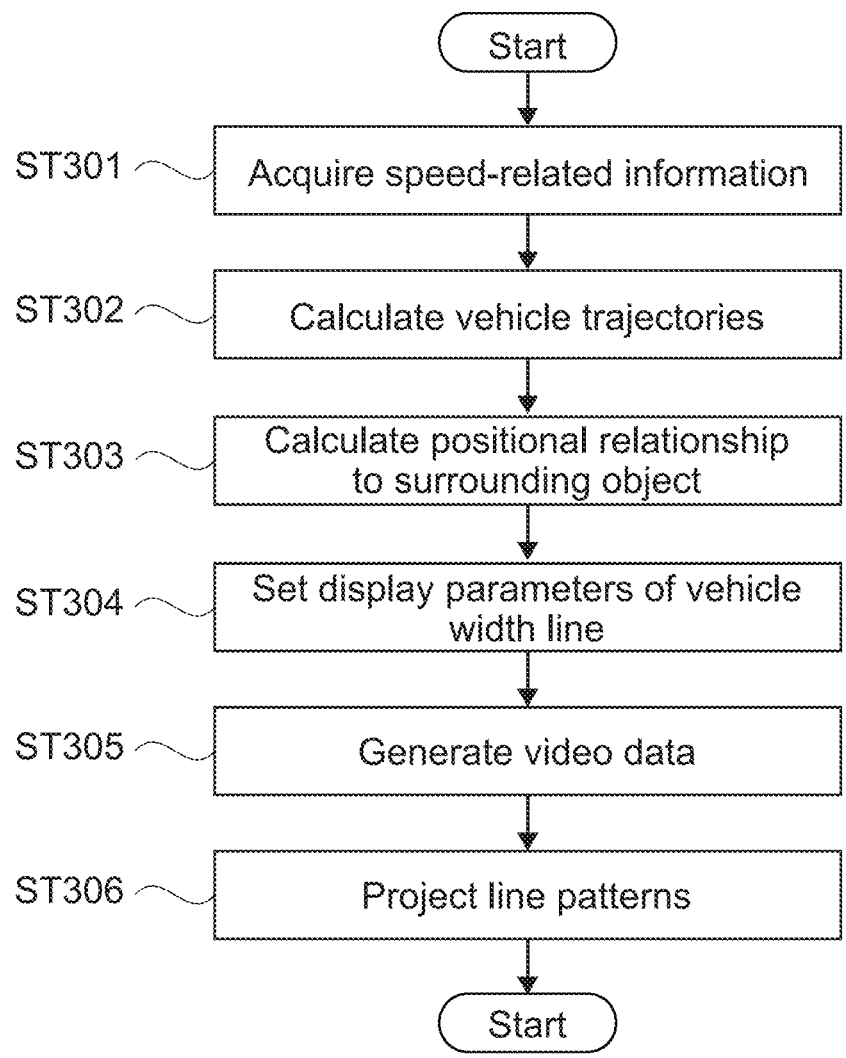
FIG. 16 A flowchart showing a basic operation example of the projection apparatus.

FIG. 16 is a flowchart showing a basic operation example of the projection apparatus 300.

The processing shown in FIG. 16 is, for example, loop processing performed repeatedly during the operation of the projection apparatus 300. Typically, in a case where the vehicle 1 is traveling forward, the processing is performed setting front lines 3a that are vehicle width lines as targets to be controlled. It should be noted that in a case where the vehicle 1 is traveling backward, processing in which rear lines 3c generated as the vehicle width lines are set as targets may be performed.

First of all, the vehicle information acquisition unit 321 acquires speed-related information (Step 301). After that, the trajectory calculation unit 222 calculates trajectories (predicted trajectories 5 and passing trajectories 6) of the vehicle 1 (Step 302).

Next, the surrounding environment recognition unit 326 performs processing of recognizing a positional relationship between the vehicle 1 and an object at the periphery and calculating positional relationship information (Step 303).

Specifically, the projection situation determination unit 330 calculates positional relationship information regarding the boundary lines 51 and each of the vehicle width lines (determination results of the distances between the boundary lines 51 and the lines).

Moreover, in a case where there is an obstacle on the vehicle width line, the space recognition unit 333 calculates positional relationship information regarding the obstacle (information indicating whether or not the vehicle width line is distorted and position information regarding the position of the distortion (obstacle)).

Next, the projection image determination unit 323 sets display parameters of vehicle width lines 8 (Step 304).

Figure 18:
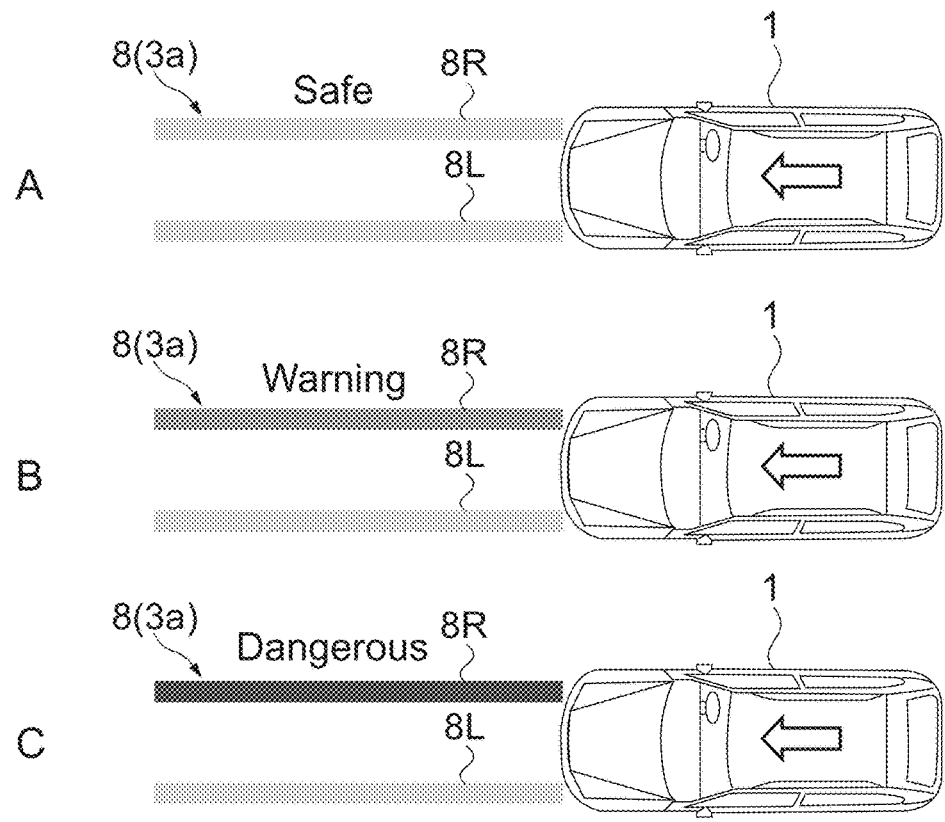
FIG. 18 A schematic view showing examples of vehicle width lines according to an approach distance.

For example, in a case where it is determined that the distance between the boundary line 51 and the vehicle width line (right or left line) is lower than a predetermined threshold, settings related to colors, blinking, and the like for the lines determined as such are changed (see FIGS. 17 and 18). Accordingly, for example, in a case where the vehicle 1 is deviated to one end of the lane (approaching the boundary line 51), it is possible to perform warning to the driver about the fact.

Figure 20:
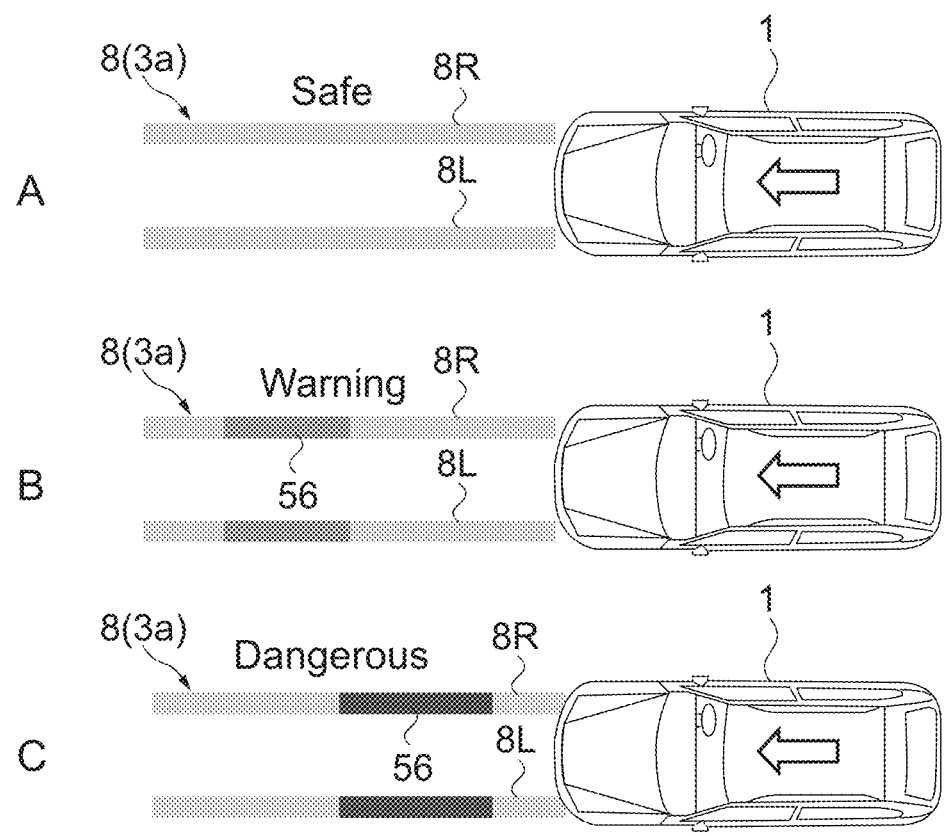
FIG. 20 A schematic view showing examples of vehicle width lines projected in a case where obstacles have been detected.

Moreover, for example, in a case where an obstacle has been detected on the vehicle width lines (right and left lines), settings related to colors, blinking, and the like for the lines on which the obstacle has been detected are changed so that the position of the detected obstacle can be seen (see FIGS. 19 and 20). Accordingly, it is possible to issue in advance a warning to the driver about the presence of the obstacle with which the vehicle 1 may collide if the vehicle 1 goes as it is.

It should be noted that in a case where approach to the boundary lines 51, an obstacle, and the like have not been detected, the projection image determination unit 323 performs processing (normal display processing) of performing normal display.

Next, the video data generation unit 324 generates video data to be output to each projection unit 310 on the basis of the projection image data (Step 305). Then, each projection unit 210 provided in the vehicle 1 respectively projects the corresponding line patterns 3 on the basis of the video data (Step 306).

Hereinafter, processing at the time of approaching the boundary line 51 and a case where an obstacle has been detected will be described specifically.

FIG. 17 is a schematic view showing examples of a scene where the vehicle width lines are projected.

FIG. 17A schematically shows a scene as viewed from the driver in a case where the vehicle 1 is going forward on a road on one lane (travel lane 40a).

Here, vehicle width lines 8 (front lines 3a) indicating the vehicle width are projected on the front of the vehicle 1 as the projection patterns 2. The lines of them, which are projected on the right side and the left side of the vehicle 1 are a right line 8R and a left line 8L.

Moreover, boundary line patterns 9 indicating the boundary lines 51 of the travel lane 40a are projected on the front of the vehicle 1. A boundary line pattern 9a of them, which is projected on the right side in the figure. The boundary line pattern 9a is projected overlapping white lines (center lines) indicating a boundary to an opposite lane. Moreover, a boundary line pattern 9b projected on the left side in the figure is projected overlapping curbs that are a boundary to a sidewalk.

In the present embodiment, the projection image determination unit 323 controls color or blinking of each line on the basis of a positional relationship between the boundary lines 51 and each of the right line 8R and the left line 8L. Specifically, the distance between the boundary line 51 and the line indicating the vehicle width (hereinafter, referred to as approach distance) is used as an indicator indicating the positional relationship.

Moreover, FIG. 17A shows each of arrows indicating a distance (right approach distance) between the right line 8R and the right boundary line 51 (white lines) and a distance (left approach distance) between the left line 8L and the left boundary line 51 (curbs). It should be noted that the arrows indicating the approach distance may be displayed as the projection patterns 2 or do not need to be displayed.

As described above, the space recognition unit 333 determines whether or not the right and left approach distances is smaller than a predetermined threshold. Then, in accordance with the determination results related to the approach distances, the projection image determination unit 323 sets the colors or the presence/absence of blinking of the right line 8R and the left line 8L.

In FIG. 17A, the right and left approach distances are determined to be larger than the predetermined threshold. In this case, the color of both the right line 8R and the left line 8L is set to be a color (e.g., whitish or bluish color) used in the normal display processing. Moreover, the colors of the boundary line patterns 9a and 9b are also set to be colors (e.g., green) used in the normal display processing.

In FIG. 17B, the vehicle 1 is traveling deviated to the right side as compared to the status shown in FIG. 17A, and the approach distance between the right line 8R and the right boundary line 51 is determined to be lower than the predetermined threshold. In this case, the projection image determination unit 323 sets the color of the right line 8R to be a color (e.g., orange) different from the color in the normal display processing. Moreover, in the example shown in FIG. 17B, in addition to the right line 8R, the right boundary line pattern 9a is also set to be a color (e.g., red) different from the color in the normal display processing. Alternatively, the right line 8R and the boundary line pattern 9a may be set to blink.

It should be noted that the left approach distance is determined to be larger than the predetermined threshold. Therefore, the colors of the left line 8L and the left boundary pattern 9b do not change.

In this manner, in the present embodiment, in a case where the distance between the boundary line 51 and the right line 8R or the left line 8L is lower than the predetermined threshold, processing of changing the color of the line or making the line blink is performed.

Accordingly, it is possible to represent that the vehicle width line 8 is approaching the opposite lane, the sidewalk, or the like to the driver in an easy-to-understand manner. As a result, the driver is enabled to intuitively recognize whether or not the current traveling position is appropriate, and safe driving can be realized. In addition, it is possible to induce driving considering the vehicle width, and it is possible to assist the driver in getting a suitable vehicle width sense.

FIG. 18 is a schematic view showing examples of the vehicle width lines 8 according to the approach distance. Here, the approach distance is determined by three phases and the color of the vehicle width lines 8 (front lines 3a) is set to be a different color at each phase. Such determination processing can be, for example, performed by threshold processing using two thresholds.

FIG. 18A shows vehicle width lines 8 projected in a case where the right and left approach distances are both in a safe range. In this case, the color of the right line 8R and the left line 8L is, for example, set to be a color (whitish or bluish color) for the normal display. These are, for example, settings similar to those of FIG. 17A.

In FIG. 18B, the right approach distance is determined to be in a range to which attention should be paid, and the left approach distance is determined to be in a safe range. In this case, the color of the right line 8R of the vehicle width lines 8 is, for example, set to be orange. It should be noted that the color of the left line 8L is not changed.

In FIG. 18C, the right approach distance is determined to be in a dangerous range and the left approach distance is determined to be in a safe range. In this case, the color of the right line 8R of the vehicle width lines 8 is, for example, set to be red. It should be noted that the color of the left line 8L is not changed.

Moreover, blinking or the like may be controlled in addition to the control to change the color of the target line 53. In this case, for example, a line that is a target is set to be orange and made to blink in the range to which attention should be paid, and a line that is a target is set to be red and made to blink at a higher frequency in a dangerous range.

Accordingly, the driver can reliably recognize the safety level of the current traveling position or the like while looking ahead.

Moreover, other than the method of determining the approach distance, the display of the vehicle width lines 8 may be controlled using outputs of a proximity sensor (distance measurement sensor such as a radar sensor) and the like. For example, in a case of approaching an object (e.g., a guardrail or another other vehicle) located near the vehicle 1, the color of the line on the side on which the approach has been detected is changed and made to blink. Accordingly, for example, a contact accident and the like not only at the front of the vehicle 1 but also on the lateral sides, the rear sides, and the like can be prevented in advance.

FIG. 19 is a schematic view showing a display example of the vehicle width lines 8 projected on obstacles. FIG. 19 schematically shows a scene where the vehicle width lines 8 intersect with obstacles 55 at the front of the vehicle 1.

For example, the right line 8R of the vehicle width lines 8 intersects with an obstacle 55a in a rectangular parallelepiped shape. The right line 8R projected along the ground is bent at a position at which a side surface of the obstacle 55a is in contact with the ground, and is projected on the side surface of the obstacle 55a.

In this case, the projection situation determination unit 330 detects a point (refraction point P1) at which the right line 8R is distorted on the basis of the original shape of the right line 8R. This refraction point P1 is used as position information of the obstacle 55a. Moreover, a portion located more forward than the refraction point P1 is an intersection portion 56 intersecting with the obstacle 55a.

Moreover, for example, a middle portion of the left line 8L of the vehicle width lines 8 intersects with an obstacle 55b placed on the ground with a cylindrical curved surface oriented upward. Here, only an intersection portion 56 of the left line 8L, which intersects with the curved surface of the obstacle 55b, is distorted and front and rear portions of the intersection portion are projected as appropriate.

In this case, on the basis of the original shape of the left line 8L, the projection situation determination unit 330 detects a refraction point P2 located more forward and a refraction point P3 located more rearward where the left line 8L is distorted. The refraction points P2 and P3 are used as position information of the obstacle 55b. Moreover, the portion between the refraction points P2 and P3 is the intersection portion 56 where the obstacle 55b is located.

In this manner, in a case where the intersection portions 56 have been detected, the display of the vehicle width lines 8 is controlled considering that the vehicle width lines 8 are projected on the obstacles 55. Specifically, on the basis of the positions (refraction points) of the obstacles 55, the projection image determination unit 323 sets the right line 8R and the left line 8L to have different colors for differentiating the portions intersecting with the obstacles 55 from the other portions.

For example, regarding the right line 8R, the color of the intersection portion 56 located more forward than the refraction point P1 is set to be red, and the color of the portion located more rearward than the refraction point P1 is set to be the color in the normal display. Moreover, for example, regarding the left line 8L, the color of the intersection portion 56 between the refraction points P2 and P3 is set to be red and the colors of the portion located more forward than the refraction point P2 and the portion located more rearward than the refraction point P3 are set to be the color for the normal display.

Accordingly, the presence of the obstacles 55 with which the vehicle 1 can come into contact if the vehicle 1 goes forward and their positions can be represented to the driver in an easy-to-understand manner.

FIG. 20 is a schematic view showing examples of vehicle width lines 8 projected in a case where the obstacles 55 have been detected. Here, the safety level regarding the obstacles 55 is determined by three phases, and the color of the vehicle width lines 8 (front lines 3a) is set to be a different color at each phase. The safety level regarding each of the obstacles 55 is set to be lower (more dangerous), for example, as the distance to the obstacle 55 is closer, or as the length of the obstacle 55 (intersection portion 56) is larger. Moreover, as the travel speed of the vehicle 1 is higher, the safety level is set to be lower. In addition, the method of determining the safety level regarding the obstacle 55 is not limited.

FIG. 20A shows, for example, vehicle width lines 8 projected in a case where the obstacles 55 have not been detected and it is safe. In this case, the color of the right line 8R and the left line 8L is set to be the color (whitish or bluish color) for the normal display in their entire areas. It should be noted that even in a case where the obstacles 55 have been detected, the color of each line does not need to be changed if the obstacles 55 are sufficiently far, for example.

FIG. 20B shows vehicle width lines 8 projected in a case where the safety level regarding each of the obstacles 55 is a level at which attention should be paid. Here, the obstacles have been detected relatively far from the vehicle 1. In this case, the color of the intersection portions 56 of the right line 8R and the left line 8L is, for example, set to be orange. Alternatively, the intersection portions 56 are set to blink. It should be noted that the color of the portions other than the intersection portions 56 is, for example, set to be the color for the normal display.

FIG. 20C shows vehicle width lines 8 projected in a case where the safety level regarding each of the obstacles 55 is a dangerous level. Here, the obstacles have been detected near the vehicle 1. In this case, the color of the intersection portion 56 is, for example, set to be red. Alternatively, the blinking speed of the intersection portion 56 is set to be higher.

The color of the portions other than the intersection portions 56 is, for example, set to be the color for the normal display. The present technology is not limited thereto, and for example, the colors or the like of the portions other than the intersection portions 56 may be changed for invoking the existence of the dangerous obstacles 55.

One of basic automobile driving skills can be a vehicle width sense. The vehicle width sense is important in various scenes such as entering a narrow road, passing an oncoming vehicle, traveling within a lane, and approaching a guardrail, wall, or the like. Examples of assisting means for correctly recognizing the vehicle width can include corner poles and fender mirrors, and these assisting devices are seldom used in recent years because they deteriorate the outer appearance.

Moreover, vehicles ensuring a wider front view have been increasing in order to allow drivers to get a vehicle width sense easily, and the vehicle width recognition greatly depends on "habituation" of drivers.

In the present embodiment, the vehicle width lines 8 indicating the vehicle width with light projected are projected. Then, the display of the right line 8R and the left line 8L of the vehicle width lines 8 are controlled in accordance with the positional relationship between the object located in the surrounding environment and the vehicle 1. Accordingly, for example, it is possible to present information indicating that the current traveling position is approaching the white lines or information indicating that the obstacle is coming into contact with the white lines to the driver so that the driver can recognize it intuitively. Accordingly, support for enhancing the driver's safety for driving and getting a correct vehicle width sense can be performed.

Moreover, the projection units 310 for projecting the projection patterns 2 can be configured to be housed in the main body of the vehicle 1. Therefore, the use of the projection apparatus 300 can provide a vehicle width sense assisting device that does not influence the outer appearance.

Other Embodiments

The present technology is not limited to the above-mentioned embodiments, and various other embodiments can be realized.

In the above-mentioned embodiments, the patterns indicating the trajectories (passing trajectories and predicted trajectories) of the vehicle are mainly set as the line patterns. The present technology is not limited thereto, and for example, patterns of straight lines extending in the front-rear direction of the vehicle 1 may be used fixedly. Alternatively, patterns with ends of left and right lines closed for example may be used. In addition, line patterns with any arbitrary shapes, sizes, colors may be used as the projection patterns.

In the above description, the single controller has been exemplified as the embodiment of the information processing apparatus according to the present technology. However, the controller may be configured separately and any computer that is connected to the controller with a wire or wirelessly may realize the information processing apparatus according to the present technology. For example, a cloud server may execute the information processing method according to the present technology. Alternatively, the information processing method according to the present technology may be executed by cooperation of the controller with another computer.

That is, the information processing method and the program according to the present technology can be executed not only in a computer system configured by a single computer but also in a computer system in which a plurality of computer operates in cooperation. It should be noted that in the present disclosure, the system means a group of a plurality of components (apparatuses, modules (components), and the like) and it does not matter whether or not all components is in the same casing. Therefore, a plurality of apparatuses housed in separate casings and connected via a network and a single apparatus in which a plurality of modules is housed in a single casing are both systems.

The execution of the information processing method and the program according to the present technology according to the present technology by the computer system includes, for example, both a case where the surrounding environment information acquisition, the projection pattern display control, and the like are executed by a single computer and a case where the respective processes are executed by different computers. Moreover, execution of the respective processes by a predetermined computer includes causing another computer to execute some or all of the processes to acquire the results.

That is, the information processing method and the program according to the present technology can also be applied to a cloud computing configuration in which a single function is shared and processed cooperatively by a plurality of apparatuses over a network.

At least two features of the features according to the present technology, which have been described above, may be combined. That is, the various features described in the respective embodiments may be arbitrarily combined across the respective embodiments. Moreover, the above-mentioned various effects are merely illustrative, not limitative, and other effects may be provided.

In the present disclosure, the "same", "equal", "orthogonal", and the like are concepts including "substantially the same", "substantially equal", "substantially orthogonal", and the like. For example, conditions included in a predetermined range (e.g., +10% range) based on "completely the same", "completely equal", "completely orthogonal", and the like are also included.

It should be noted that the present technology can also take the following configurations.

(1) An information processing apparatus, including:
   an acquisition unit that acquires surrounding environment information regarding a surrounding environment of a vehicle; and
   a projection control unit that controls, on the basis of the surrounding environment information, display of a projection pattern projected on a peripheral road surface of the vehicle from a projection unit mounted on the vehicle.

(2) The information processing apparatus according to (1), in which
   the projection pattern includes a linear first pattern projected on front in a traveling direction of the vehicle and a linear second pattern projected on rear in the traveling direction.

(3) The information processing apparatus according to (2), in which
   the first pattern includes a pair of lines projected on left and right sides of the vehicle, and
   the projection control unit controls, on the basis of the surrounding environment information, display of a target line of the first pattern, the target line being projected on a side of a target lane to which a lane change of the vehicle is to be performed.

(4) The information processing apparatus according to (3), in which
   the surrounding environment information includes traffic situation information indicating a traffic situation at a periphery of the vehicle including the target lane, and
   the projection control unit estimates a change risk associated with the lane change of the vehicle on the basis of the traffic situation information and controls a color or blinking of the target line on the basis of the change risk.

(5) The information processing apparatus according to (4), in which
   the traffic situation information includes information indicating a free space of the target lane, arrangement information of another vehicle traveling at the periphery of the vehicle, and information regarding a relative speed of the other vehicle with respect to the vehicle.

(6) The information processing apparatus according to (4) or (5), in which
   the projection control unit determines the change risk in a plurality of levels and sets the target line to have a different color for each of the determined levels.

(7) The information processing apparatus according to any one of (3) to (6), in which the projection control unit that divides the target line by colors for differentiating a portion in which the vehicle is allowed to travel from a portion in which the vehicle is not allowed to travel.

(8) The information processing apparatus according to any one of (3) to (7), further including
an eye gaze direction detection unit that detects an eye gaze direction of a driver of the vehicle, in which
the projection control unit determines whether or not to perform display control of the target line on the basis of a change in the eye gaze direction.

(9) The information processing apparatus according to any one of (2) to (8), in which
the surrounding environment information includes following vehicle information regarding a following vehicle behind the vehicle, and
the projection control unit estimates a collision risk with the following vehicle on the basis of the following vehicle information and discontinuously changes the second pattern in accordance with the collision risk.

(10) The information processing apparatus according to (9), in which
the following vehicle information includes information about at least one of a relative distance and a relative speed between the vehicle and the following vehicle.

(11) The information processing apparatus according to (9) or (10), in which
the projection control unit increases a width of the second pattern in a case where the collision risk is equal to or higher than a first threshold and is lower than a second threshold higher than the first threshold, and makes the second pattern blink in a case where the collision risk is equal to or higher than the second threshold.

(12) The information processing apparatus according to any one of (2) to (11), in which
the surrounding environment information includes positional relationship information indicating a positional relationship between an object at the periphery of the vehicle and the vehicle, and
the projection control unit generates a pair of lines indicating a vehicle width of the vehicle as the first pattern and individually controls display of the pair of lines on the basis of the positional relationship information.

(13) The information processing apparatus according to (12), in which
the object is a boundary line indicating a range in which the vehicle has to travel, and
the projection control unit controls a color or blinking of the line on the basis of a positional relationship between the boundary line and the line.

(14) The information processing apparatus according to (13), in which
the acquisition unit includes a first detection unit that detects, as the positional relationship information, a distance between the boundary line and the line from an image obtained by imaging the boundary line and the line simultaneously, and
the projection control unit changes the color of the line or makes the line blink in a case where the distance between the boundary line and the line is lower than a predetermined threshold.

(15) The information processing apparatus according to any one of (12) to (14), in which
the acquisition unit includes a second detection unit that detects, as the positional relationship information, a position of an obstacle on the line by detecting a distortion of the line from an image obtained by imaging the line, and
the projection control unit divides the line by colors for differentiating an intersection portion with the obstacle from another portion on the basis of the position of the obstacle.

(16) The information processing apparatus according to any one of (2) to (15), further including
a predicted trajectory calculation unit that calculates a predicted trajectory on which the vehicle is predicted to pass, in which
the projection control unit generates the first pattern indicating the predicted trajectory.

(17) The information processing apparatus according to any one of (2) to (16), further including
a passing trajectory calculation unit that calculates a passing trajectory on which the vehicle has passed, in which
the projection control unit generates a second pattern indicating the passing trajectory.

(18) An information processing method, including:
by a computer system
acquiring surrounding environment information regarding a surrounding environment of a vehicle; and
controls, on the basis of the surrounding environment information, display of a projection pattern projected on a peripheral road surface of the vehicle from a projection unit mounted on the vehicle.

(19) A program that causes a computer system to execute:
a step of acquiring surrounding environment information regarding a surrounding environment of a vehicle; and
a step of controlling, on the basis of the surrounding environment information, display of a projection pattern projected on a peripheral road surface of the vehicle from a projection unit mounted on the vehicle.

(20) A projection apparatus, including:
a projection unit that is mounted on a vehicle and projects a projection pattern on a peripheral road surface of the vehicle;
an acquisition unit that acquires surrounding environment information regarding a surrounding environment of the vehicle; and
a projection control unit that controls, on the basis of the surrounding environment information, display of the projection pattern projected from the projection unit.

REFERENCE SIGNS LIST 1, 1a, 1b vehicle
2 projection pattern
3 line pattern
3a front line
3c rear line
3b middle line
4 traveling direction
5 predicted trajectory
6 passing trajectory
8L left line
8R right line
8 vehicle width line
10, 10a to 10h, 210, 310 projection unit
12 driver monitoring camera
13, 213, 313 surrounding environment sensor unit
20, 220, 320 controller
22, 222, 322 trajectory calculation unit
23, 223, 323 projection image determination unit 26, 226, 326 surrounding environment recognition unit
41 target lane
51 boundary line
53 target line
55, 55a, 55b obstacle
100, 200, 300 projection apparatus

The invention claimed is:

1. An information processing apparatus, comprising:
circuitry configured to
acquire vehicle status information regarding a status of a vehicle; and
control, on a basis of the vehicle status information, display of a projection pattern projected on a peripheral road surface of the vehicle from a projector mounted on the vehicle, wherein
the circuitry is further configured to change at least one of a pattern of the projection pattern and a color of the projection pattern depending on whether the status of the vehicle is a parking status or a traveling status.

2. The information processing apparatus according to claim 1, wherein
the circuitry is further configured to
acquire surrounding environment information regarding a surrounding environment of the vehicle, and
control, on a basis of the surrounding environment information, display of the projection pattern projected on the peripheral road surface of the vehicle from the projector.

3. The information processing apparatus according to claim 2, wherein
the projection pattern includes a linear first pattern projected on front in a traveling direction of the vehicle and a linear second pattern projected on rear in the traveling direction.

4. The information processing apparatus according to claim 3, wherein
the surrounding environment information includes following vehicle information regarding a following vehicle behind the vehicle, and
the circuitry is further configured to estimate a collision risk with the following vehicle on the basis of the following vehicle information and discontinuously change the linear second pattern in accordance with the collision risk.

5. The information processing apparatus according to claim 4, wherein
the following vehicle information includes information about at least one of a relative distance and a relative speed between the vehicle and the following vehicle.

6. The information processing apparatus according to claim 4, wherein
the circuitry is further configured to increase a width of the linear second pattern in a case where the collision risk is equal to or higher than a first threshold and is lower than a second threshold higher than the first threshold, and make the linear second pattern blink in a case where the collision risk is equal to or higher than the second threshold.

7. The information processing apparatus according to claim 3, wherein
the surrounding environment information includes positional relationship information indicating a positional relationship between an object at the periphery of the vehicle and the vehicle, and
the circuitry is further configured to generate a pair of lines indicating a vehicle width of the vehicle as the linear first pattern and individually control display of the pair of lines on the basis of the positional relationship information.

8. The information processing apparatus according to claim 7, wherein
the object is a boundary line indicating a range in which the vehicle has to travel, and
the circuitry is further configured to control a color or blinking of the lines on the basis of a positional relationship between the boundary line and the lines.

9. The information processing apparatus according to claim 8, wherein
the circuitry is further configured to detect, as the positional relationship information, a distance between the boundary line and the lines from an image obtained by imaging the boundary line and the lines simultaneously, and change the color of the lines or makes the lines blink in a case where the distance between the boundary line and the lines is lower than a predetermined threshold.

10. The information processing apparatus according to claim 7, wherein
the circuitry is further configured to detect, as the positional relationship information, a position of an obstacle on the lines by detecting a distortion of the lines from an image obtained by imaging the lines, and divide the lines by colors for differentiating an intersection portion with the obstacle from another portion on the basis of the position of the obstacle.

11. The information processing apparatus according to claim 3, wherein
the circuitry is further configured to calculate a passing trajectory on which the vehicle has passed, and generate a second pattern indicating the passing trajectory.

12. The information processing apparatus according to claim 3, wherein
the linear first pattern includes a pair of lines projected on left and right sides of the vehicle, and
the circuitry is further configured to control, on the basis of the surrounding environment information, display of a target line of the linear first pattern, the target line being projected on a side of a target lane to which a lane change of the vehicle is to be performed.

13. The information processing apparatus according to claim 12, wherein
the circuitry is further configured to divide the target line by colors for differentiating a portion in which the vehicle is allowed to travel from a portion in which the vehicle is not allowed to travel.

14. The information processing apparatus according to claim 12, wherein
the circuitry is further configured to detect an eye gaze direction of a driver of the vehicle, and determine whether or not to perform display control of the target line on the basis of a change in the eye gaze direction.

15. The information processing apparatus according to claim 12, wherein
the surrounding environment information includes traffic situation information indicating a traffic situation at a periphery of the vehicle including the target lane, and
the circuitry is further configured to estimate a change risk associated with the lane change of the vehicle on the basis of the traffic situation information and control a color or blinking of the target line on the basis of the change risk.

16. The information processing apparatus according to claim 15, wherein the traffic situation information includes information indicating a free space of the target lane, arrangement information of another vehicle traveling at the periphery of the vehicle, and information regarding a relative speed of the another vehicle with respect to the vehicle.

17. The information processing apparatus according to claim 15, wherein
the circuitry is further configured to determine the change risk in a plurality of levels and set the target line to have a different color for each of the levels.

18. An information processing method, to be executed by a computer system, the method comprising:
acquiring vehicle status information regarding a status of a vehicle;
controlling, on the basis of the vehicle status information, display of a projection pattern projected on a peripheral road surface of the vehicle from a projector mounted on the vehicle; and
changing at least one of a pattern of the projection pattern and a color of the projection pattern depending on whether the status of the vehicle is a parking status or a traveling status.

19. A non-transitory computer-readable storage medium storing a program that causes a computer system to execute:
a step of acquiring vehicle status information regarding a status of a vehicle;
a step of controlling, on the basis of the vehicle status information, display of a projection pattern projected on a peripheral road surface of the vehicle from a projector mounted on the vehicle; and
a step of changing at least one of a pattern of the projection pattern and a color of the projection pattern depending on whether the status of the vehicle a parking status or a traveling status.

20. A projection apparatus, comprising:
a projector that is mounted on a vehicle and projects a projection pattern on a peripheral road surface of the vehicle; and
circuitry configured to
acquire vehicle status information regarding a status of the vehicle,
control, on the basis of the vehicle status information, display of the projection pattern projected from the projector, and
change at least one of a pattern of the projection pattern and a color of the projection pattern depending on whether the status of the vehicle is a parking status or a traveling status.

* * * * *